US012596885B2

(12) United States Patent
Sommerfield et al.

(10) Patent No.: US 12,596,885 B2
(45) Date of Patent: Apr. 7, 2026

(54) AUTOMATICALLY LABELING ITEMS USING A MACHINE-TRAINED LANGUAGE MODEL

(71) Applicant: Microsoft Technology Licensing, LLC, Redmond, WA (US)

(72) Inventors: Daniel Arthur Sommerfield, Mercer Island, WA (US); Weizhu Chen, Kirkland, WA (US); Adarsh Ramanathan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 210 days.

(21) Appl. No.: 18/385,358

(22) Filed: Oct. 30, 2023

(65) Prior Publication Data

US 2025/0139380 A1 May 1, 2025

(51) Int. Cl.
*G06F 40/40* (2020.01)

(52) U.S. Cl.
CPC .................................... *G06F 40/40* (2020.01)

(58) Field of Classification Search
None
See application file for complete search history.

(56) References Cited

U.S. PATENT DOCUMENTS 11,049,044 B1 6/2021 Habenschuss et al.
11,176,934 B1 * 11/2021 Venkatesh Raman .. G06F 9/445

2021/0035556 A1 * 2/2021 Shen ................. G06F 18/24765
2022/0383190 A1 * 12/2022 He .......................... G06N 3/045
2023/0154213 A1 * 5/2023 Gao ........................ G06V 10/25
382/159
2023/0196105 A1 * 6/2023 Wang .................... G06N 3/044
706/25
2023/0376857 A1 * 11/2023 Gokalp ............. G06F 16/24578

FOREIGN PATENT DOCUMENTS

CN 112434794 A 3/2021

OTHER PUBLICATIONS

Golde et al. "Fabricator: An Open Source Toolkit for Generating Labeled Training Data with Teacher LLMs". arXiv: 2309.09582v1 [cs.CL] Sep. 18, 2023 (Year: 2023).*

(Continued)

*Primary Examiner* — Jesse S Pullias

(57) ABSTRACT

A computer-implemented labeling technique generates a task description that describes a labeling task to be given to a language model. The technique then sends a prompt to the language model, which includes the task description and a particular item to be labeled. The technique receives a response provided by the language model in response to the prompt, which specifies a class assigned by the language model to the item. In some implementations, the task description specifies a group of suggested classes to be used in classifying the particular item. The task description also invites the language model to specify another class upon a finding that none of the group of suggested classes applies to the item. The technique also allows a user to stop and restart a labeling run at any point in the labeling run. Other aspects of the technique include consensus processing and weight updating.

19 Claims, 13 Drawing Sheets

502 ➔
EXAMPLE TASK
DESCRIPTION

(56) References Cited

OTHER PUBLICATIONS

Tekumalla et al. ("Leveraging Large Language Models and Weak Supervision for Social Media data annotation: an evaluation using COVID-19 self-reported vaccination tweets" arXiv:2309.06503, Submitted Sep. 12, 2023 (Year: 2023).*

Nakamoto et al. ("Enhancing Automated Scoring of Math Self Explanation Quality Using LLM Generated Datasets: A Semi Supervised Approach", Computers 2023, 12, 217, published Oct. 24, 2023 (Year: 2023).*

Punnakkal et al. "BABEL: Bodies, Action and Behavior with English Labels". arXiv:2106.09696v2 [cs.CV] Jun. 23, 2021 (Year: 2021).*

Simig et al. "Open Vocabulary Extreme Classification Using Generative Models". arXiv:2205.05812v1 [cs.CL] May 12, 2022 (Year: 2022).*

Hou et al. "PromptBoosting: Black-Box Text Classification with Ten Forward Passes". arXiv:2212.09257v2 [cs.CL] Jul. 3, 2023 (Year: 2023).*

Legenzoff, Derek "Function calling is now available in Azure OpenAI Service," available at read://https_techcommunity.microsoft.com/?url=https%3A%2F%2Ftechcommunity.microsoft.com%2Ft5%2Fazure-ai-services-blog%2Ffunction-calling-is-now-available-in-azure-openai-service%2Fba-p%2F3879241, Azure AI Services Blog, Jul. 20, 2023, 4 pages.

"Labelbox," available from https://labelbox.com/, Labelbox, San Francisco, California, accessed on Oct. 15, 2023, 9 pages.

"Power Generative AI With Your Data," available from https://scale.com/, Scale AI, San Francisco, California, accessed on Oct. 15, 2023, 7 pages.

"Technologies to power quality data labeling," available from https://toloka.ai/technologies/, Toloka, Lucerne, Switzerland, accessed on Oct. 15, 2023, 7 pages.

Mehra, Akshit, "Elevating ML: AI-Driven Data Annotation with LabelGPT," available from https://www.labellerr.com/blog/ai-powered-data-annotation/, Labellerr, Wilmington, Delaware, Jul. 12, 2023, 40 pages.

Villalba, Marcia, "New-Ready-to-use Models and Support for Custom Text and Image Classification Models in Amazon SageMaker Canvas," available from https://aws.amazon.com/blogs/aws/new-ready-to-use-models-and-support-for-custom-text-and-image-classification-models-in-amazon-sagemaker-canvas/, AWS News Blogs, Mar. 31, 2023, 9 pages.

Google Patents translation of Chinese Patent document CN112434794A, available from https://patents.google.com/patent/CN112434794A/en?oq=112434794, accessed on Oct. 15, 2023, 7 pages.

"Get started with Prompt flow (preview)," available https://learn.microsoft.com/en-us/azure/machine-learning/prompt-flow/get-started-prompt-flow?view=azureml-api-2, Azure Machine Learning, Sep. 13, 2023, 22 pages.

"Labeling images and text documents," available at https://learn.microsoft.com/en-us/azure/machine-learning/how-to-label-data?view=azureml-api-2, Azure Machine Learning, Aug. 11, 2023, 12 pages.

Dosovitskiy, Alexey "An Image is Worth 16×16 Words: Transformers for Image Recognition at Scale," arXiv, arXiv:2010.11929v2 [cs.CV], Jun. 3, 2021, 22 pages.

Devlin, et al., "BERT: Pre-training of Deep Bidirectional Transformers for Language Understanding," arXiv, arXiv:1810.04805v2 [cs.CL], May 24, 2019, 16 pages.

Vaswani, et al., "Attention Is All You Need," 31st Conference on Neural Information Processing Systems (NIPS 2017), 2017, 11 pages.

Radford, et al., "Improving Language Understanding by Generative Pre-Training," available at http://cdn.openai.com/research-covers/language-unsupervised/language_understanding_paper.pdf, OpenAI, San Francisco, California, Jun. 11, 2018, 12 pages.

Touvron, et al., "LLaMA: Open and Efficient Foundation Language Models," arXiv, arXiv:2302.13971v1 [cs.CL], Feb. 27, 2023, 27 pages.

Scao, et al., "BLOOM: A 176B-Parameter Open-Access Multilingual Language Model," arXiv, arXiv:2211.05100v2 [cs.CL], Dec. 11, 2022, 62 pages.

Brown, et al., "Language Models are Few-Shot Learners," arXiv, arXiv:2005.14165v4 [cs.CL], Jul. 22, 2020, 75 pages.

Sharma, Manu, "Model Foundry: Automating data tasks with foundation models," available at https://labelbox.com/blog/model-foundry-automating-data-tasks-with-foundation-models/?ref=labelbox.ghost.io, Labelbox, San Francisco, California, Jun. 6, 2023, 5 pages.

"Model Foundry," available at https://labelbox.com/model-foundry/?ref=labelbox.ghost.io, Labelbox, San Francisco, California, accessed on Oct. 22, 2023, 6 pages.

Yang, Karen, "How to automate labeling for product categorization with LLMs," available at https://labelbox.com/blog/how-to-automate-labeling-for-product-categorization-with-llms/, San Francisco, California, Jun. 15, 2023, 10 pages.

"How to fine-tune Vertex AI LLMs with Labelbox," available at https://labelbox.com/guides/how-to-fine-tune-vertex-ai-models-with-labelbox/, San Francisco, California, accessed on Oct. 22, 2023, 9 pages.

"Get started with active learning," available at https://labelbox.com/guides/the-guide-to-getting-started-with-active-learning/, San Francisco, California, accessed on Oct. 15, 2023, 15 pages.

Sharma, Manu, "Manu Sharma/CEO of Labelbox about the future of data labeling automation," available at https://thesequence.substack.com/p/-manu-sharmaceo-of-labelbox-about?ref=labelbox.ghost.io, Labelbox, San Francisco, California, Mar. 10, 2021, 8 pages.

"Consensus," available at https://docs.labelbox.com/docs/consensus, Labelbox, San Fransico, California, accessed on Oct. 22, 2023, 8 pages.

espacenet.com abstract for Chinese patent document CN112434794A, available at https://worldwide.espacenet.com/patent/search/family/074698660/publication/CN112434794A?q=CN112434794A, accessed on Oct. 22, 2022, 1 page.

Abdelsalam, et al., "IIRC: Incremental Implicitly-Refined Classification," arXiv, arXiv:2012.12477v2 [cs.CV], Jan. 11, 2021, 31 pages.

"GPT-4V(ision) System Card," available at https://cdn.openai.com/papers/GPTV_System_Card.pdf, Open AI, San Francisco, California, Sep. 25, 2023, 18 pages.

* cited by examiner

OVERVIEW OF OPERATION OF
THE AUTOMATED AGENT

TASK DESCRIPTION

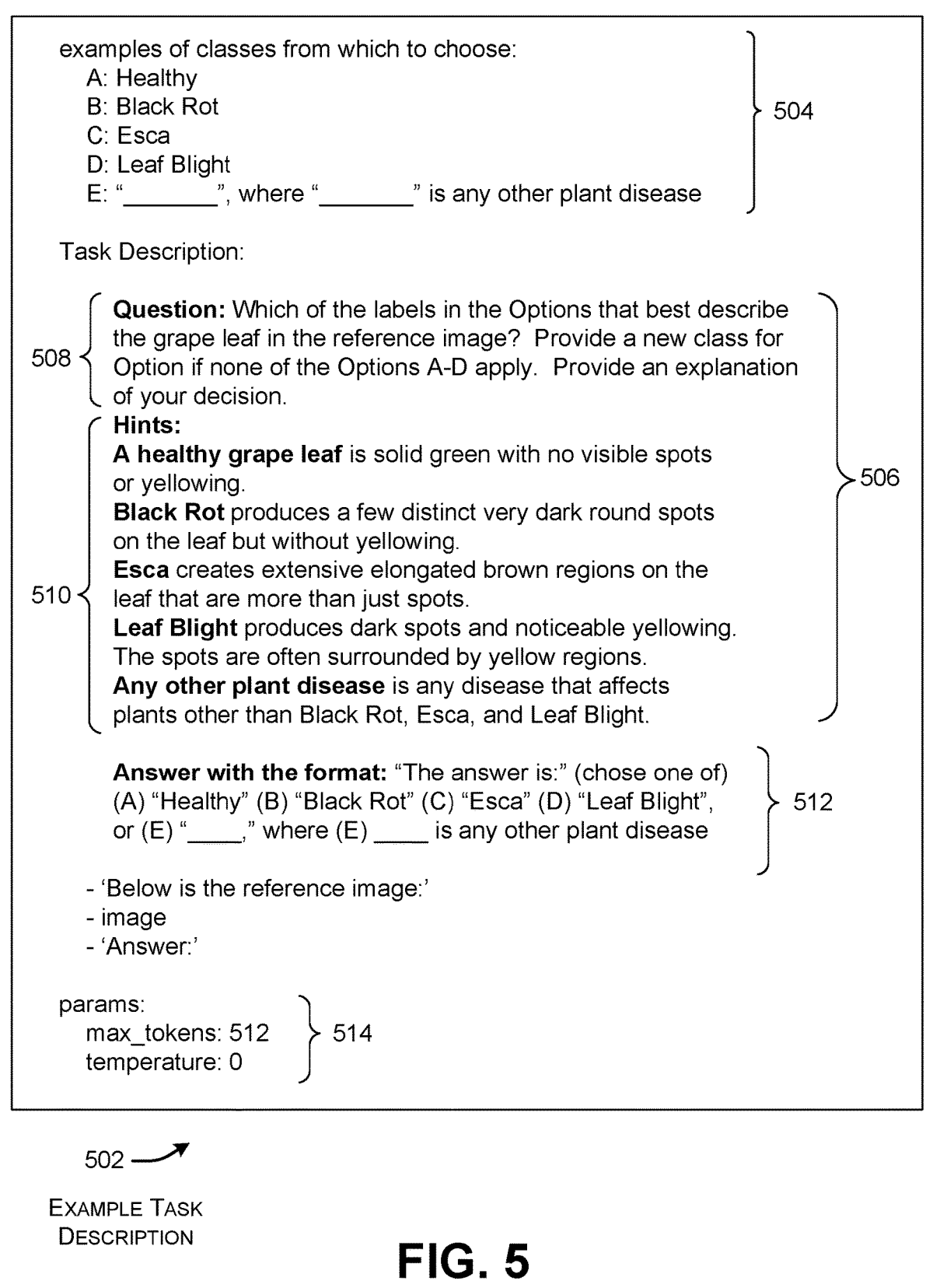

← 402 examples of classes from which to choose:
   A: Healthy
   B: Black Rot
   C: Esca
   D: Leaf Blight
   E: "_____", where "_____" is any other plant disease

504

Task Description:

Question: Which of the labels in the Options that best describe the grape leaf in the reference image? Provide a new class for Option if none of the Options A-D apply. Provide an explanation of your decision.

508

Hints:
A healthy grape leaf is solid green with no visible spots or yellowing.
Black Rot produces a few distinct very dark round spots on the leaf but without yellowing.
Esca creates extensive elongated brown regions on the leaf that are more than just spots.
Leaf Blight produces dark spots and noticeable yellowing. The spots are often surrounded by yellow regions.
Any other plant disease is any disease that affects plants other than Black Rot, Esca, and Leaf Blight.

510

506

Answer with the format: "The answer is:" (chose one of) (A) "Healthy" (B) "Black Rot" (C) "Esca" (D) "Leaf Blight", or (E) "____," where (E) ____ is any other plant disease

512

- 'Below is the reference image:'
- image
- 'Answer:' params:
   max_tokens: 512
   temperature: 0

514

502 ➚

EXAMPLE TASK
DESCRIPTION

FIG. 5

TRANSFORMER-BASED MODEL

902

POST-PROCESSING COMPONENT 926

OUTPUT EMBEDDING INFORMATION 924

928

NTH TRANSFORMER COMPONENT 922

SECOND TRANSFORMER COMPONENT 920

918

ADD & NORMALIZE COMPONENT 2 914

FFN COMPONENT 912

ADD & NORMALIZE COMPONENT 1 910

ATTENTION HEAD 1 916

ATTENTION COMPONENT 908

FIRST TRANSFORMER COMPONENT 904

906

930

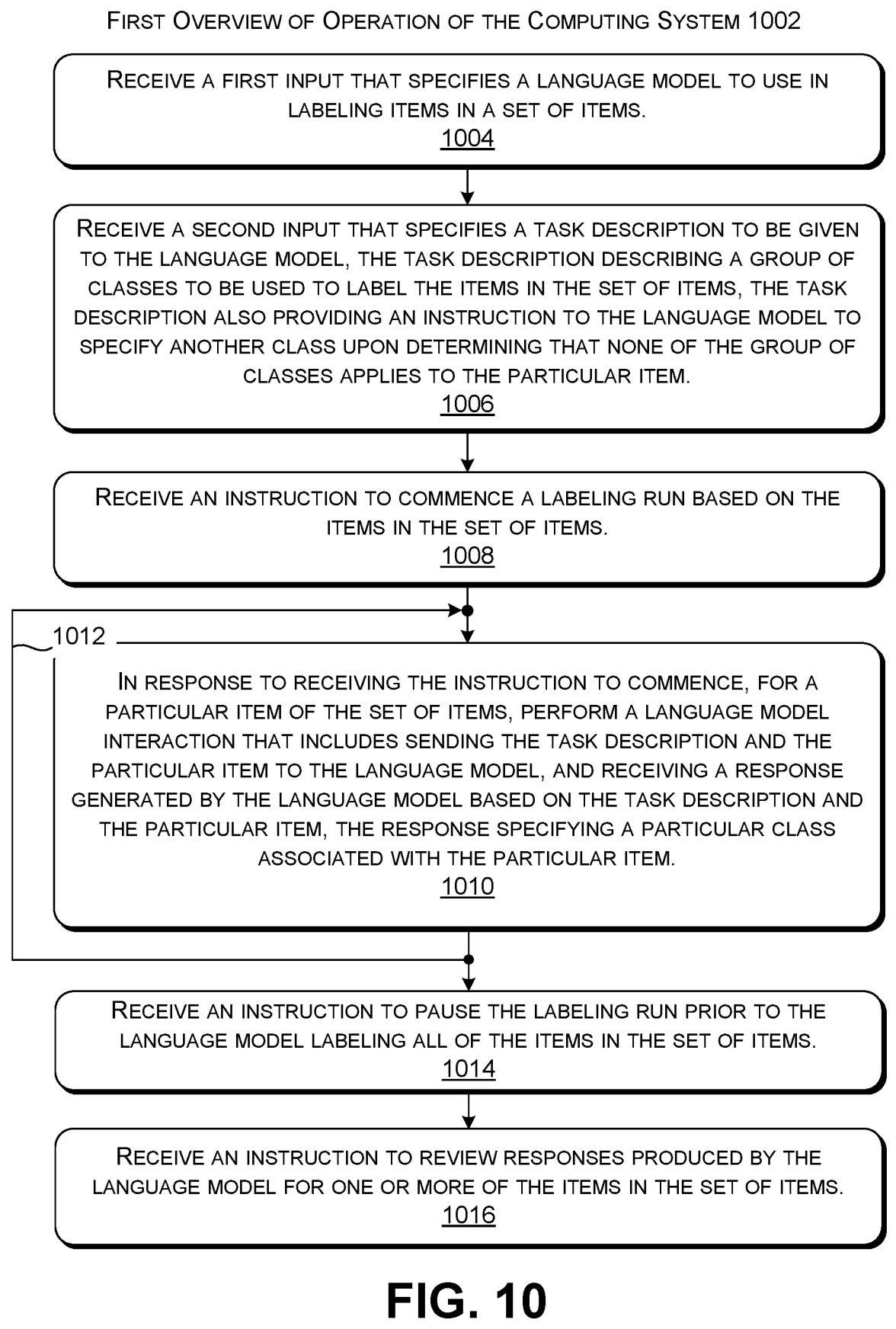

FIRST OVERVIEW OF OPERATION OF THE COMPUTING SYSTEM 1002

RECEIVE A FIRST INPUT THAT SPECIFIES A LANGUAGE MODEL TO USE IN LABELING ITEMS IN A SET OF ITEMS.
1004

RECEIVE A SECOND INPUT THAT SPECIFIES A TASK DESCRIPTION TO BE GIVEN TO THE LANGUAGE MODEL, THE TASK DESCRIPTION DESCRIBING A GROUP OF CLASSES TO BE USED TO LABEL THE ITEMS IN THE SET OF ITEMS, THE TASK DESCRIPTION ALSO PROVIDING AN INSTRUCTION TO THE LANGUAGE MODEL TO SPECIFY ANOTHER CLASS UPON DETERMINING THAT NONE OF THE GROUP OF CLASSES APPLIES TO THE PARTICULAR ITEM.
1006

RECEIVE AN INSTRUCTION TO COMMENCE A LABELING RUN BASED ON THE ITEMS IN THE SET OF ITEMS.
1008

1012

IN RESPONSE TO RECEIVING THE INSTRUCTION TO COMMENCE, FOR A PARTICULAR ITEM OF THE SET OF ITEMS, PERFORM A LANGUAGE MODEL INTERACTION THAT INCLUDES SENDING THE TASK DESCRIPTION AND THE PARTICULAR ITEM TO THE LANGUAGE MODEL, AND RECEIVING A RESPONSE GENERATED BY THE LANGUAGE MODEL BASED ON THE TASK DESCRIPTION AND THE PARTICULAR ITEM, THE RESPONSE SPECIFYING A PARTICULAR CLASS ASSOCIATED WITH THE PARTICULAR ITEM.
1010

RECEIVE AN INSTRUCTION TO PAUSE THE LABELING RUN PRIOR TO THE LANGUAGE MODEL LABELING ALL OF THE ITEMS IN THE SET OF ITEMS.
1014

RECEIVE AN INSTRUCTION TO REVIEW RESPONSES PRODUCED BY THE LANGUAGE MODEL FOR ONE OR MORE OF THE ITEMS IN THE SET OF ITEMS.
1016

FIG. 10

SECOND OVERVIEW OF OPERATION OF THE COMPUTING SYSTEM 1102

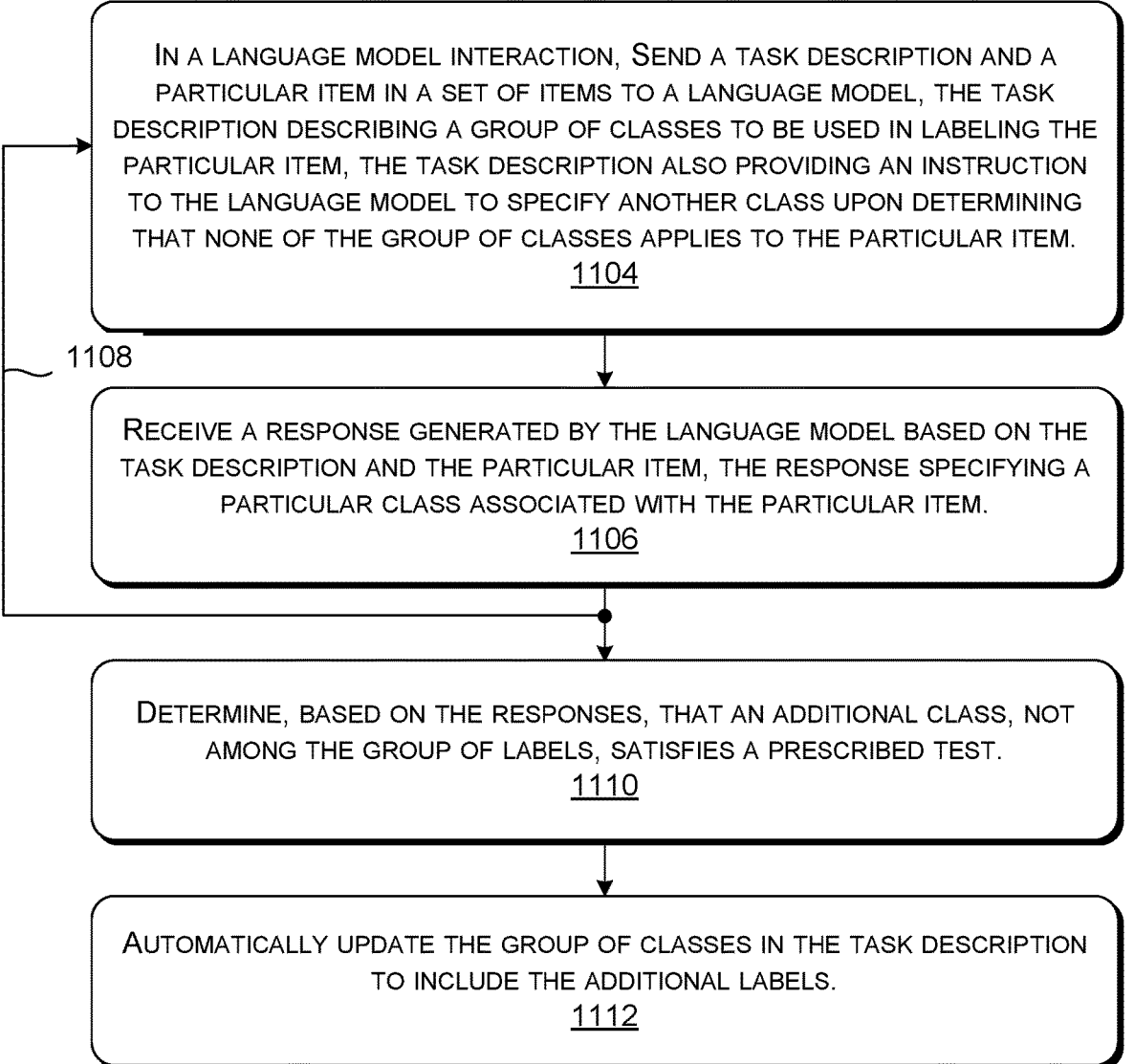

IN A LANGUAGE MODEL INTERACTION, SEND A TASK DESCRIPTION AND A PARTICULAR ITEM IN A SET OF ITEMS TO A LANGUAGE MODEL, THE TASK DESCRIPTION DESCRIBING A GROUP OF CLASSES TO BE USED IN LABELING THE PARTICULAR ITEM, THE TASK DESCRIPTION ALSO PROVIDING AN INSTRUCTION TO THE LANGUAGE MODEL TO SPECIFY ANOTHER CLASS UPON DETERMINING THAT NONE OF THE GROUP OF CLASSES APPLIES TO THE PARTICULAR ITEM.
1104

1108

RECEIVE A RESPONSE GENERATED BY THE LANGUAGE MODEL BASED ON THE TASK DESCRIPTION AND THE PARTICULAR ITEM, THE RESPONSE SPECIFYING A PARTICULAR CLASS ASSOCIATED WITH THE PARTICULAR ITEM.
1106

DETERMINE, BASED ON THE RESPONSES, THAT AN ADDITIONAL CLASS, NOT AMONG THE GROUP OF LABELS, SATISFIES A PRESCRIBED TEST.
1110

AUTOMATICALLY UPDATE THE GROUP OF CLASSES IN THE TASK DESCRIPTION TO INCLUDE THE ADDITIONAL LABELS.
1112

FIG. 11

THIRD OVERVIEW OF OPERATION OF THE COMPUTING SYSTEM 1202

SEND PLURAL TASK DESCRIPTIONS TO PLURAL LANGUAGE MODELS, TOGETHER WITH A PARTICULAR ITEM OF A SET OF ITEMS, A PARTICULAR TASK DESCRIPTION OF THE PLURAL TASK DESCRIPTIONS DESCRIBING A PARTICULAR GROUP OF CLASSES TO BE USED TO LABEL THE PARTICULAR ITEM, AND AT LEAST TWO TASK DESCRIPTIONS OF THE PLURAL TASK DESCRIPTIONS DIFFERING FROM EACH OTHER.
1204

RECEIVE RESPONSES GENERATED BY THE PLURAL LANGUAGE MODELS BASED ON THE PLURAL TASK DESCRIPTIONS AND THE PARTICULAR ITEM, THE RESPONSES INCLUDING PARTICULAR CLASSES SPECIFIED BY THE PLURAL LANGUAGE MODELS ASSOCIATED WITH THE PARTICULAR ITEM.
1206

DETERMINE A FINAL CLASS FOR THE PARTICULAR ITEM BASED ON THE PARTICULAR CLASSES GENERATED BY THE PLURAL LANGUAGE MODELS.
1208

FIG. 12

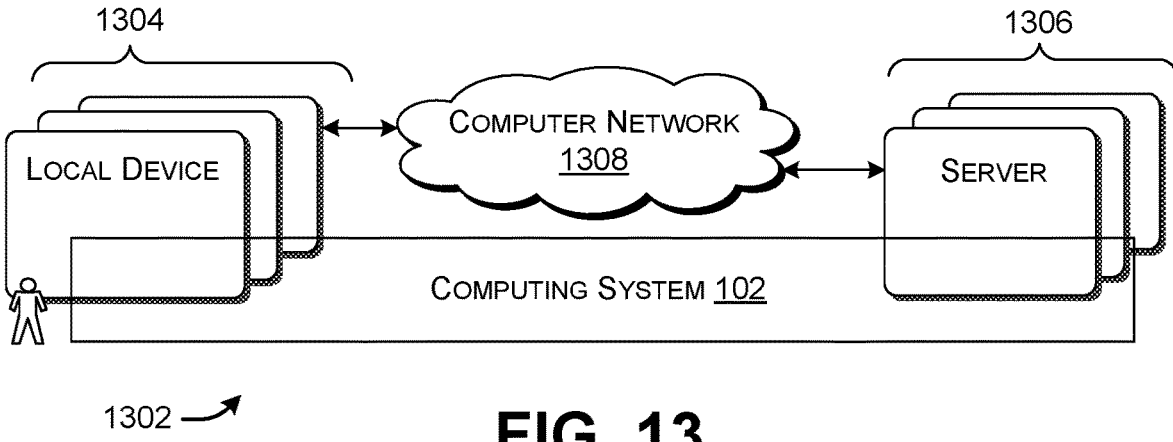

1304          1306

LOCAL DEVICE          COMPUTER NETWORK 1308          SERVER

COMPUTING SYSTEM 102

AUTOMATICALLY LABELING ITEMS USING A MACHINE-TRAINED LANGUAGE MODEL

BACKGROUND

There exists a need to label large quantities of items for various downstream uses. As used herein, "items" include text-bearing items, image-bearing items, video-bearing items, etc., or any combination thereof. For example, a developer may seek to generate a training set for use in training a machine-trained model. To produce such a training set, the developer sometimes enlists a group of human agents to manually assign labels to the items. In another context, a developer may wish to tag items for use in generating an index for use by any type of application (such as a search application). Here too, the developer sometimes uses human agents to label the items. In general, the process of manually labeling items consumes considerable time and resources. It is also cumbersome, expensive, and prone to error.

SUMMARY

A computer-implemented labeling technique generates a task description which describes a labeling task to be given to a machine-trained language model ("language model"). The technique then sends a prompt to the language model, which includes the task description and a particular item to be labeled. The technique receives a response provided by the language model in response to the prompt, which specifies a particular class assigned by the language model.

According to some implementations, the technique also collects responses from at least one human agent.

According to some implementations, the task description specifies a group of suggested classes to be used in classifying the particular item. In some implementations, the task description also invites the language model to specify a new class upon a finding that none of the group of suggested classes applies to the particular item.

According to some implementations, the technique allows a user to pause the labeling of a set of items prior to the completion of processing of all the items in the set of items. This affords the user the opportunity to review the responses produced thus far, and to modify the task description in any manner deemed appropriate. The technique allows the user to resume the labeling of the items upon completion of the review.

According to some implementations, the technique generates plural task descriptions for distribution to plural language models and/or human agents. The plural descriptions characterize a same task in different ways.

According to some implementations, the technique assigns a final class to an item based on a consideration of responses produced by plural language models and/or human agents. For example, the technique chooses the most common class that appears in the responses as the final class.

According to some implementations, the technique modifies the relevance of responses produced by individual language models based on respective weights. The technique updates the weights based on the assessed performance of the individual language models.

According to some implementations, the technique automatically adds another class to a group of suggested classes upon a determination that a predetermined test has been satisfied. In some implementations, the predetermined test depends on a number of responses which specify the additional class and/or a number of different language models that that have generated responses that specify the additional class.

According to some implementations, the technique determines that a predetermined transition point has been reached in the labeling of a set of items. Upon reaching this conclusion, the technique trains a dedicated machine-trained model on the basis of the items that have been labeled thus far. For another transition point, the technique transitions from the use of a first type of language model to a second type of language model.

Among its technical merits, the technique allows a user to label a large amount of items in a time-efficient, resource-efficient, and relatively inexpensive manner. The technique also improves the quality and consistency of labeling results (compared to a strategy of procuring manually-labeled items).

The above-summarized technique is capable of being manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF DRAWINGS

FIG. 5 shows an example of the task description of FIG. 4.

FIG. 10-12 are flowcharts that show three processes that summarize the operation of the computing system of FIG. 1.

FIG. 13 shows computing equipment that, in some implementations, is used to implement the computing system of FIG. 1.

The same numbers are used throughout the disclosure and figures to reference like components and features.

DETAILED DESCRIPTION

A. Overview

Figure 1:
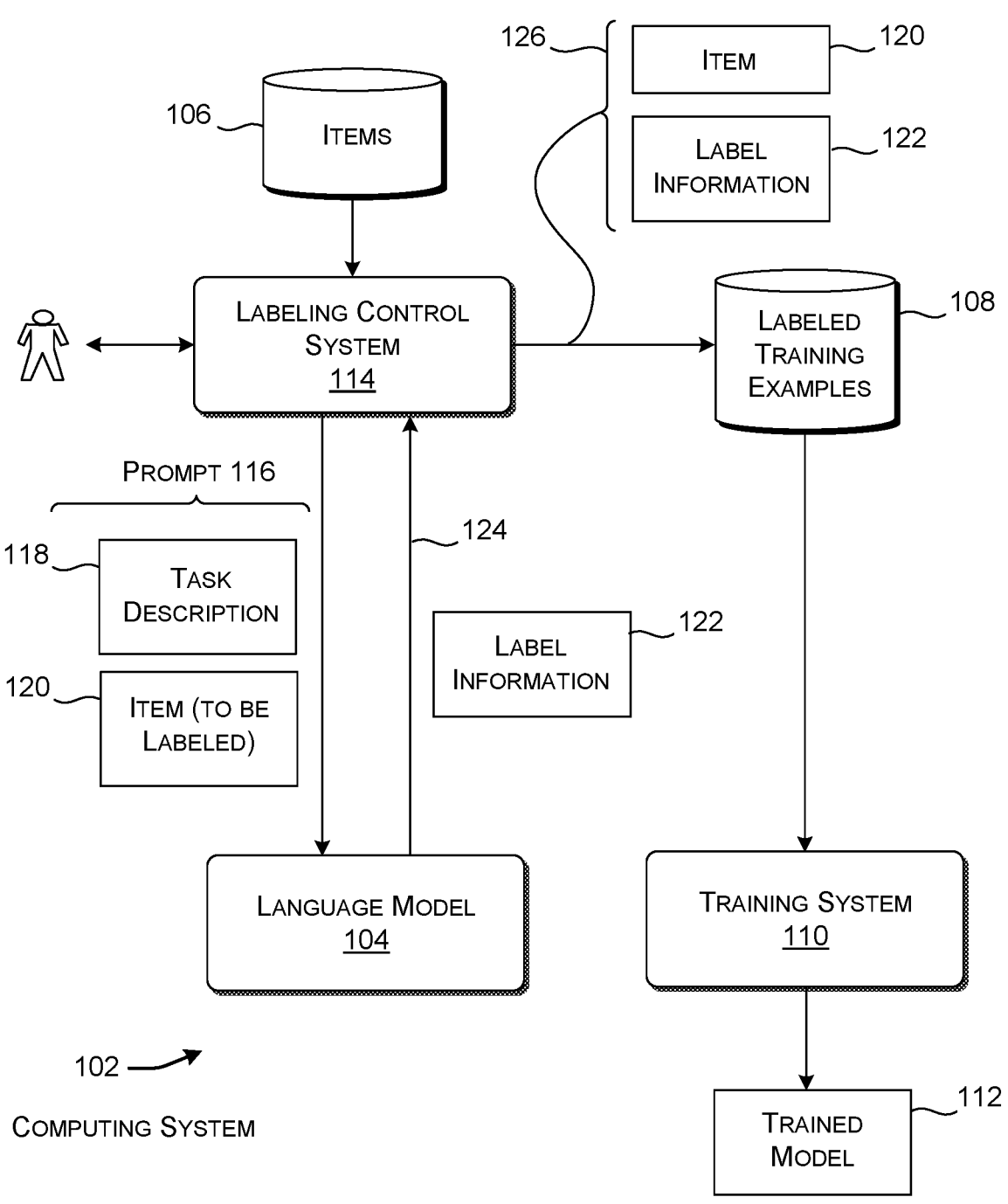
FIG. 1 shows a computing system for automatically labeling items using a machine-trained language model ("language model").

FIG. 1 shows a computing system 102 for automatically labeling items using a machine-trained language model ("language model") 104. An "item" refers to a unit of information containing any content type or types. For example, an item includes a passage of text of any length, an image, a video, or any combination thereof.

A "language model" refers to a machine-trained model that functions as a pattern completion engine. The pattern completion engine includes weights that reflect statistical patterns that have been learned by performing training on a typically large collection of training examples. In an auto-regressive mode of operation, given a set of input tokens, the pattern completion engine predicts a next token that is most likely to follow the input tokens. The pattern completion engine then adds the predicted token to the end of the input tokens, to produce an updated set of input tokens, and then repeats its analysis for the updated set of tokens. This process continues until the pattern completion engine predicts a stop token, which is a signal that the auto-regression operation should terminate. In some implementations, the pattern completion engine uses an attention mechanism to perform its predictions. The attention mechanism determines the relevance between pairs of tokens in the set of input tokens. Additional information regarding one illustrative implementation of the language model 104 is set forth below in Section E.

Figure 14:
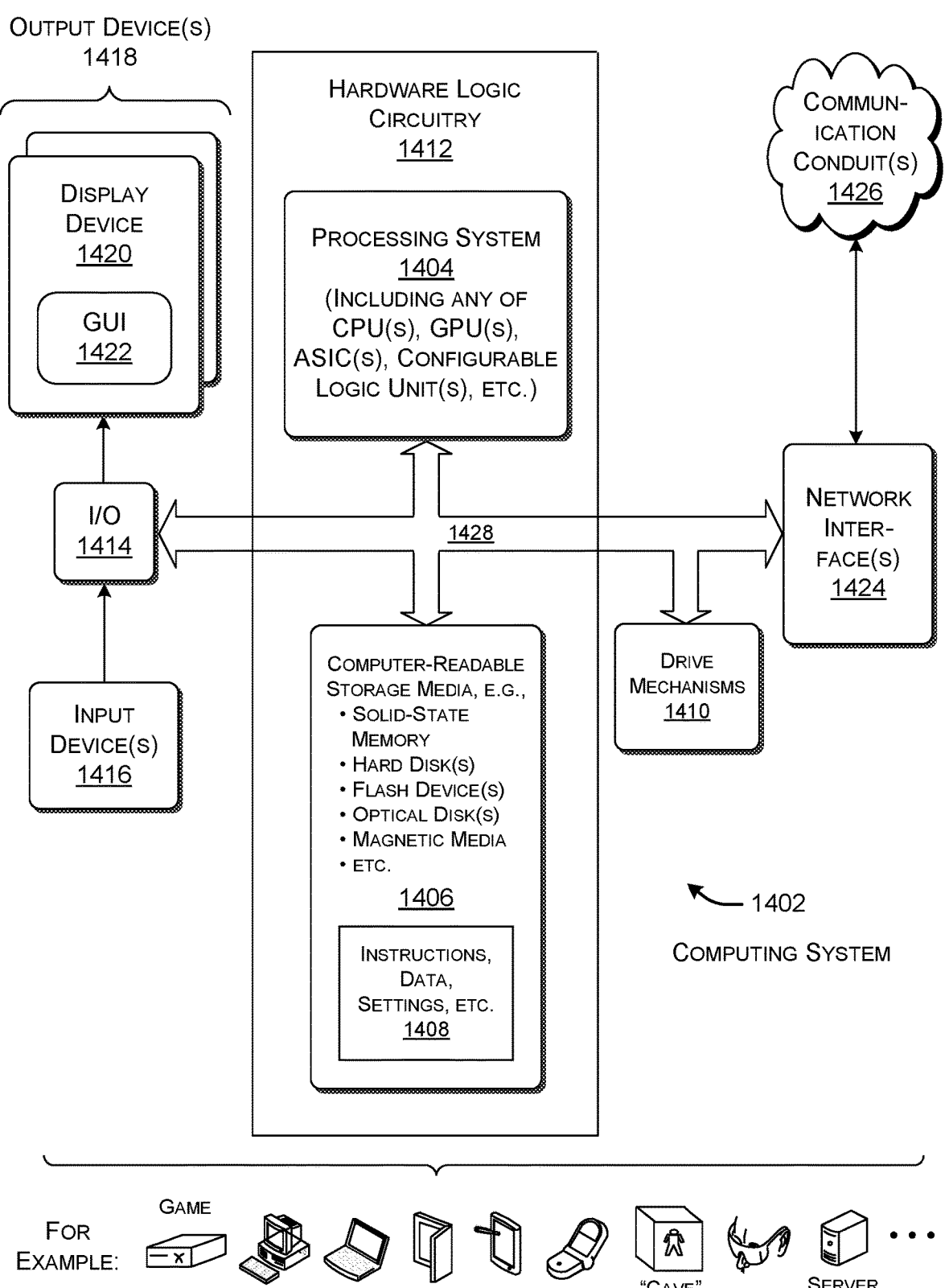
FIG. 14 shows an illustrative type of computing system that, in some implementations, is used to implement any aspect of the features shown in the foregoing drawings.

More generally, a "machine-trained model" or "model" refers to computer-implemented logic for executing a task using machine-trained weights that are produced in a training operation. A "weight" refers to any type of parameter value that is iteratively produced by the training operation. A "token" refers to a unit of information processed by a machine-trained model, such as a word or a part of a word. In some cases, a tokenizer produces the tokens, but an item (e.g., a text passage) is said to be composed of tokens in a general sense (in which "token" is a synonym of "part"), irrespective of when and where those tokens are actually produced. A "prompt" refers to a sequence of tokens submitted to a machine-trained model. An "embedding" is a distributed vector that represents an information item in a vector space. A "distributed vector," in turn, expresses the semantic content of an information item by distributing information over its k dimensions. A distributed vector is in contrast to a sparse one-hot vector that allocates particular dimensions of the vector to particular concepts. In some contexts, terms such as "component," "module," "engine," and "tool" refer to parts of computer-based technology that perform respective functions. FIGS. 13 and 14, described below, provide examples of illustrative computing equipment for performing these functions.

In some contexts, a developer uses the computing system 102 to apply labels to items in a data store 106 of items. A data store 108 stores the labeled items. A training system 110 then uses supervised learning to train a machine-trained model ("model") 112 of any type based on the labeled items. Different applications are capable of making use of the model 112. For example, a labeling platform uses the model 112 to facilitate labeling additional items.

In other contexts, a developer uses the computing system 102 to build an index for use by any downstream application, such as a search engine. That is, the index associates each item with its features. One such feature is the label(s) assigned by the language model to the item. Still other environments are capable of making use of the computing system 102. The following examples, however, will be principally framed in the illustrative context in which the labeled items are used to train the model 112.

A labeling control system 114 generates a prompt 116 to be sent to the language model 104. The prompt 116 includes a task description 118 and a particular item 120, selected from the items in the data store 106. The task description 118 instructs the language model 104 how it is to process the particular item 120. In the representative examples presented herein, the task description 118 specifically instructs the language model 104 to classify the particular item 120, and to assign one of more classes to the particular item 120 based on its conclusions. To simplify the explanation, the examples will principally present the case in which the language model 104 assigns a single class to the particular item 120.

The language model 104 transforms the prompt 116 into label information 122, which expresses the class selected by the language model 104. The labeling control system 114 receives a response 124 from the language model 104 that includes the label information 122. The labeling control system 114 then processes the response 124 in any environment-specific manner. In one case, the labeling control system 114 constructs a training example 126 based on the particular item 120 and the label information 122.

As another function, the labeling control system 102 dynamically and automatically adjusts the task description 118. For example, assume that the task description 118 instructs the language model 104 to choose a class from a group of predefined classes. Assume that the task description 118 also instructs the language model 104 to assign a new class upon determining that none of the group of classes applies to the particular item 120. Here, the labeling control system 114 determines whether a predetermined number of responses (associated with a plurality of items) support the conclusion that a new class should be added to the current group of classes (because the responses specify the new class), and/or a predetermined percentage of responses classified so far support the conclusion that the new class should be added (because the responses specify the new class with a threshold normalized frequency). If so, the labeling control system 114 automatically updates the predefined group of classes in the task description 118 to include the new class.

In other implementations, the labeling control system 114 generates different task descriptions associated with the same task. The labeling control system 114 distributes different prompts to plural respective language models. The different prompts specify the different task descriptions and the same particular item 120. In some implementations, the different language models represent different model instances of the same language model 104. For example, the language model 104 implements these instances using separate processors and/or threads. Alternatively, or in addition, at least two of the language models represent different kinds of language models. The different language models have different capabilities and use different sets of machine-trained weights. In some implementations, the different language models also have different architectures.

The language models process their associated prompts and generate responses that express their conclusions. The labeling control system 114 processes the responses in various environment-specific ways. In some implementations, the labeling control system 114 assigns a final class to the particular item 120 based on the classes assigned to this item 120 by the plural language models (and/or plural human agents). In some implementations, each of the language models has a weight associated therewith to reflect the confidence that is attributed to its predictions. In some implementations, the labeling control system 114 determines the final class to be assigned to the particular item 120 by generating a tally or weighted tally of the number of times each of the language models has detected each class, and selecting the class having the highest score (e.g., the most "votes"). The above-described functions will described below in greater detail in Section D.

In some implementations, the training system 110 uses cross entropy to assess the differences between model-predicted output results and ground-truth output results. The ground-truth output results are given by the label information produced by the language model 104. In some implementations, the training system 110 iteratively updates the weights of the model 112 being trained using stochastic gradient descent in combination with back propagation. The model 112 represents any type of machine-trained functionality, such as a deep neural network classifier model, a logistic regression classifier model, a decision-tree-based classifier model, a Naïve Bayesian model, a support vector machine (SVM) model, and so on, or any combination thereof. Neural network models include any of a transformer-based language model (e.g., the kind of BERT model described in Devin, et al., "BERT: Pre-training of Deep Bidirectional Transformers for Language Understanding, arXiv: 2010.11929v2 [cs.CV], Jun. 3, 2021, 22 pages), a convolutional neural network (CNN) model, a recurrent neural network (RNN) model, a stable diffusion model, and so on, or any combination thereof.

In conclusion to Section A, the computing system 102 system is technically advantageous because it eliminates or reduces the reliance on manual resources, and therefore reduces the time and the amount of resources required to label items, and the considerable expense associated therewith. These resources, for example, include the memory and processor-related resources required to host a manual labeling platform. The computing system 102 eliminates or reduces the use of manual resources because the language model 104 is able to begin labeling items in zero-shot fashion, without the preexistence of manually-labeled images. It is true that the computing system 102 may require a user to manually change the task description, but this effort involves a single modification to a single data record, which requires far less effort and computing resources than manually interacting with a labeling platform to access plural items, view the items, view labeling instructions, and manually enter classifications for the items with any explanatory notes that are deemed appropriate.

The technique is also scalable because it enables a user to quickly adapt a task description to a new environment having new labeling objectives. This is accomplished by changing the text of the task description, which can be performed regardless of (independent of) whether any items have been manually labeled beforehand. The computing system 102 also enables modification of the task description during a labeling run by pausing the labeling run, changing the task description, and restarting the labeling run; this makes the computing system 102 highly responsive to a user's control.

The technique also provides consistent results based on its reduced reliance on human agents, who can produce inconsistent and unpredictable classification results based on the sometimes idiosyncratic ways in which they interpret and apply labeling instructions. That is, a single human agent may vary the manner that ambiguous items are classified over the course of a labeling run and over successive labeling runs, and two or more users can also have different judgments with respect to ambiguous items. The language model 104, in contrast, applies the same set of trained weights to all items, and therefore more effectively ensures consistency within a run, and from run to run.

The technique also allows the training system 110 to begin training without the preliminary process of manually creating a training set. As noted above, this is because the language model 104 generates classifications (that contribute to a training set) based on the instructions that are given to the language model 104 that define a classification task, not based on a dedicated machine-trained model that requires training in advance of performing the classification task. Eliminating or reducing the use of a manual training process reduces the use of computer resources that would otherwise contribute to the manual labeling, reduces human labor, and expedites and facilitates the task of generating the training set.

B. Illustrative Automated Agent

In some implementations, the labeling control system 114 is implemented as a computer program that operates as an automated agent, otherwise known as a robot or BOT. Here, the labeling control system 114 enables a user to quickly set up a modeling run, stop a modeling run before its completion, revise the configuration of the modeling run, and resume the operation of the modeling run from the juncture at which it was paused.

Figure 2:
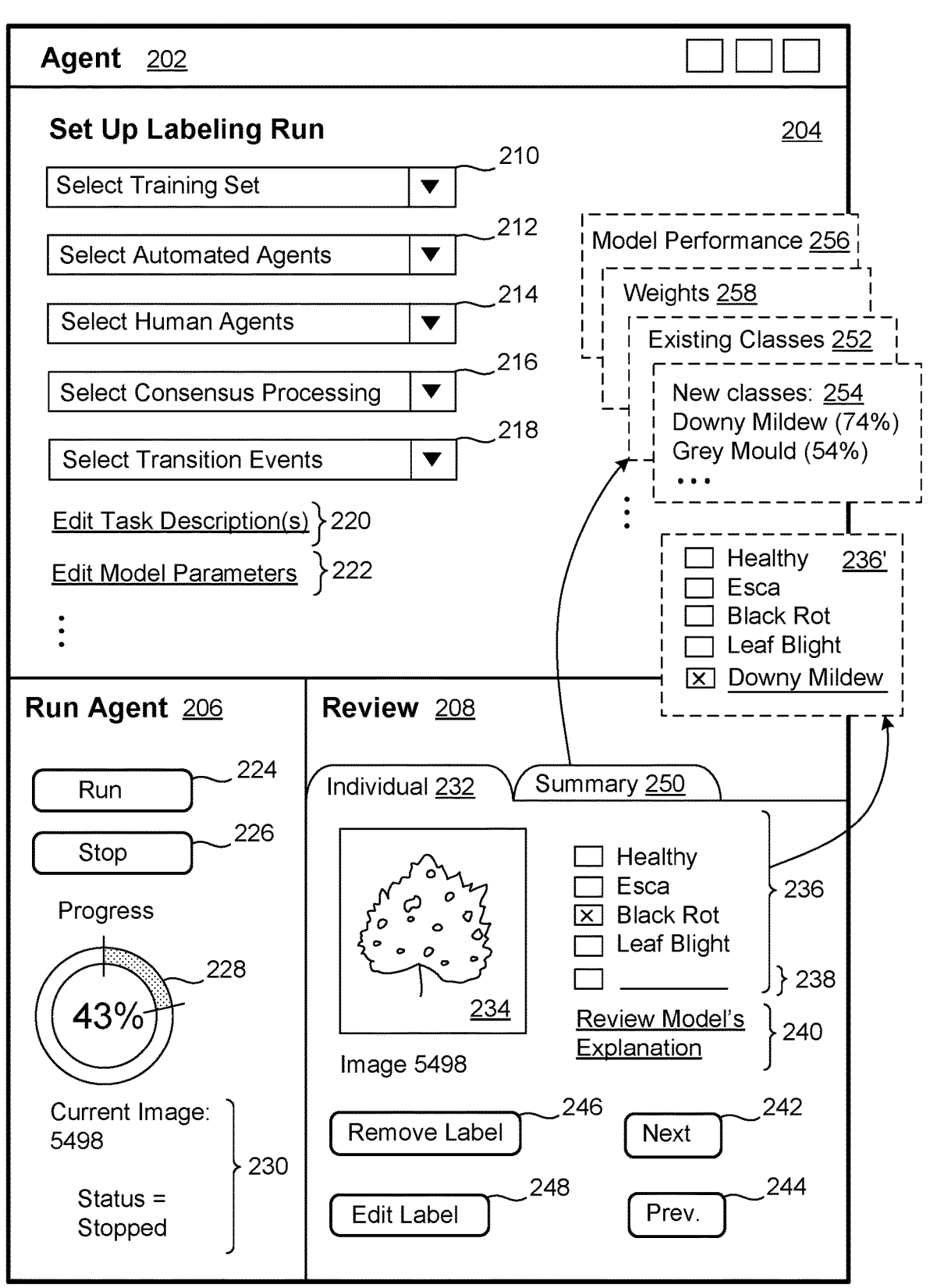
FIG. 2 shows an illustrative user interface presentation generated by a computer-implemented agent. The computer-implemented agent, in turn, is one implementation of the computing system of FIG. 1.

FIG. 2 shows one type of user interface presentation 202 presented by the labeling control system 114 on a display device. All aspects of the user interface presentation 202 are representative of only one type of interface. For instance, other implementations adopt: (a) a different selection of information than what is shown in FIG. 2; and/or (b) a different organization of information than what is shown in FIG. 2; and/or (c) a different collection of graphical controls to interact with the user interface presentation 202, compared to that shown in FIG. 2. For example, FIG. 2 shows the illustrative use of drop-down lists, each of which provides a group of predefined entries. In some implementations, this type of graphical control is replaced or supplemented with a picker-type selection mechanism, and/or radio buttons, and/or an input box for free-form text entry, etc.

In the running example presented herein, assume that the items in the data store 106 are images of grape leafs. The goal of the computing system 102 is to assign a single label that classifies the disease that afflicts a grape leaf shown in each image, if any. In other implementations, the language model 104 is instructed to attribute any number of applicable classes to a single item.

The user interface presentation 202 includes three mains sections. A first section 204 allows a user to set up a labeling run. A second section 206 allows the user to start and stop the labeling run. A third section 208 allows the user to review the label information specified by the language model 104 for the images classified so far in the labeling run. When paused, the user also remains free to change any aspects of the labeling run via the first section 204. In one case, for example, the user adjusts the task description 118 upon concluding that the label information that has been produced so far is of poor quality. Alternatively, or in addition, the user decides to modify the task description 118 to add a new class to a list of predefined classes. This user takes this action because the language model 104 has detected this class in a several of the images classified so far.

Referring in greater detail to the first section 204, a first graphical control 210 allows the user to choose a set of items to be labeled. A second graphical control 212 allows the user to select one or more language models to be used in the labeling run. These language models refer to different instances of the same base language model 104, and/or two or more different kinds of language models. For example, the user chooses a first type of model that is capable of classifying just text-based tokens. The user also chooses a second type of model that is capable of classifying a combination of text-based tokens and image-based tokens. Note that the user interacts with the first section 204 to configure each language model; however, to facilitate explanation, assume here that the user interacts with the first section 204 to define a single language model. A third graphical control 214 allows a user to select human resources to be used in a labeling run, if any. A fourth graphical control 216 allows the user to select the type of consensus processing that is applied to the classes detected by different automated and/or manual labeling agents. A fifth graphical control 218 allows the user to choose one or more transition points. For example, the user interacts with the graphical control 218 to define the conditions under which the training system 110 is to commence the training of the model 112, e.g., by specifying that the training system 110 is to commence training upon the labeling of a prescribed number of images.

Activation of a sixth graphical control 220 causes the labeling control system 114 to invoke an editing interface (not shown) by which the user creates or edits the task description 118. As explained above, the task description 118 provides instructions to the language model 104 that define the task it is being requested to perform. In some cases, the task description 118 also includes one or more examples of how to transform input information into a correct response. Section C provides information regarding an illustrative task description 118. Again assume that the user only defines a single task description 118 to be given to a single language model 104, but the second section 206 also enables a user to define plural task descriptions for plural language models and/or human agents. Activation of a seventh graphical control 222 causes the labeling control system 114 to select other parameters that govern the operation of the language model 104 (or plural language models). One such parameter defines the maximum size of the task description 118 that the language model 104 will accept in a single submission (e.g., 512 tokens in one case).

Referring to the second section 206, activation of a first graphical control 224 causes the labeling control system 114 to commence or resume a labeling run that has been defined via the first section 204, without aborting the labeling run in wholesale fashion. Activation of a second graphical control 226 causes the labeling control system 114 to pause a labeling run that is in progress. A progress presentation 228 shows the current progress of a labeling run. In the example shown in FIG. 2, the progress presentation 228 shows that 43 percent of a set of images have been processed. A status presentation 230 shows a current status of a labeling run. In the example shown in FIG. 2, the status presentation 230 shows that the last image that was classified is Image No. 5498, and that the labeling run is currently paused. In some implementations, the labeling control system 114 randomly selects the order in which it processes items.

In the illustrative example of FIG. 2, the third section 208 is configured as a tabbed user interface presentation, in which each tab presents a different aspect of the label information produced by the language model 104. For instance, an individual-item review subsection 232 allows the user to review the label information produced for a single image 234, here corresponding to an image of a grape leaf afflicted with a particular disease. A label presentation 236 indicates that the language model 104 has classified the disease as "black rot." Assume that black rot is one of a predefined group of diseases explicitly specified in the task description 118 and shown in the label presentation 236.

The task description 118 also gives the language model 104 the opportunity to specify a new disease, upon concluding that none of the diseases in the predefined group applies to the image 234. If chosen by the language model 104, such a new class will appear as an entry 238 in the label presentation 236. For example, assume that, with respect to another image, the language model 104 detects that the image suffers from a disease named "downy mildew." The label presentation 236' visually represents this outcome. Finally, a graphical control 240 gives the user the opportunity to review the language model's explanation of why it detected a particular class for a particular image.

Activation of a graphical control 242 causes the labeling control system 114 to advance to a next image (if any) in the series of images classified so far. Activation of a graphical control 244 causes the labeling control system 114 to move back to a previous image (if any) in the series of images. Activation of a graphical control 246 causes the labeling control system 114 to remove the label information for the currently presented image. Activation of a graphical control 248 causes the labeling control system 114 to advance to an interface that allows a user to manually label the class, e.g., by changing the disease from black rot to downy mildew.

A summary subsection 250 presents information that summarizes the results produced by the language model 104, at the current juncture in a labeling run. For example, a first presentation 252 shows a count (or other summary information) of the number of times that the language model 104 has detected each class in the list of predefined classes. A second presentation 254 shows a count (or other summary information) of the number of times that the language model 104 has detected a particular new disease (e.g., downy mildew), not currently represented in the predefined classes. Each number in parentheses (e.g., 74% for downy mildew) represents a current level of confidence that a new class should be added to the predefined list of classes. In some implementations, this level of confidence is expressed as a ratio of the number of times that the language model 104 has chosen the new class to a number of times that are required to add the new class to the list of predefined classes. A third presentation 256 assesses the accuracy of the label information produced thus far, e.g., as assessed by one or more human users and/or an authoritative machine-trained model (including a language model that operates in an evaluation mode). A fourth presentation 258 shows the values of weights currently assigned to the individual language models and/or human agents being used in a labeling run. Additional information regarding the use of weights is presented in Section D. The summary information in the third (review) section 208 enables the user to quickly and easily understand the impact of a current task description, and thus empowers the user to make appropriate corrective changes to the task description. In some implementations, the summary information explicitly allows a user to compare the classification behavior and/or accuracy produced for different task descriptions, and/or to view trends in classification behavior and/or accuracy across plural changes to the class description. This enables the user to gain appreciation of aspects of the task description that are having the greatest effect on classification behavior and/or accuracy. In some implementations, the summary information in the third section 208 also enables the user to compare the performance of different language models that are being used in a labeling run that use different task descriptions and/or different model types and/or different setup parameters, etc.

Figure 3:
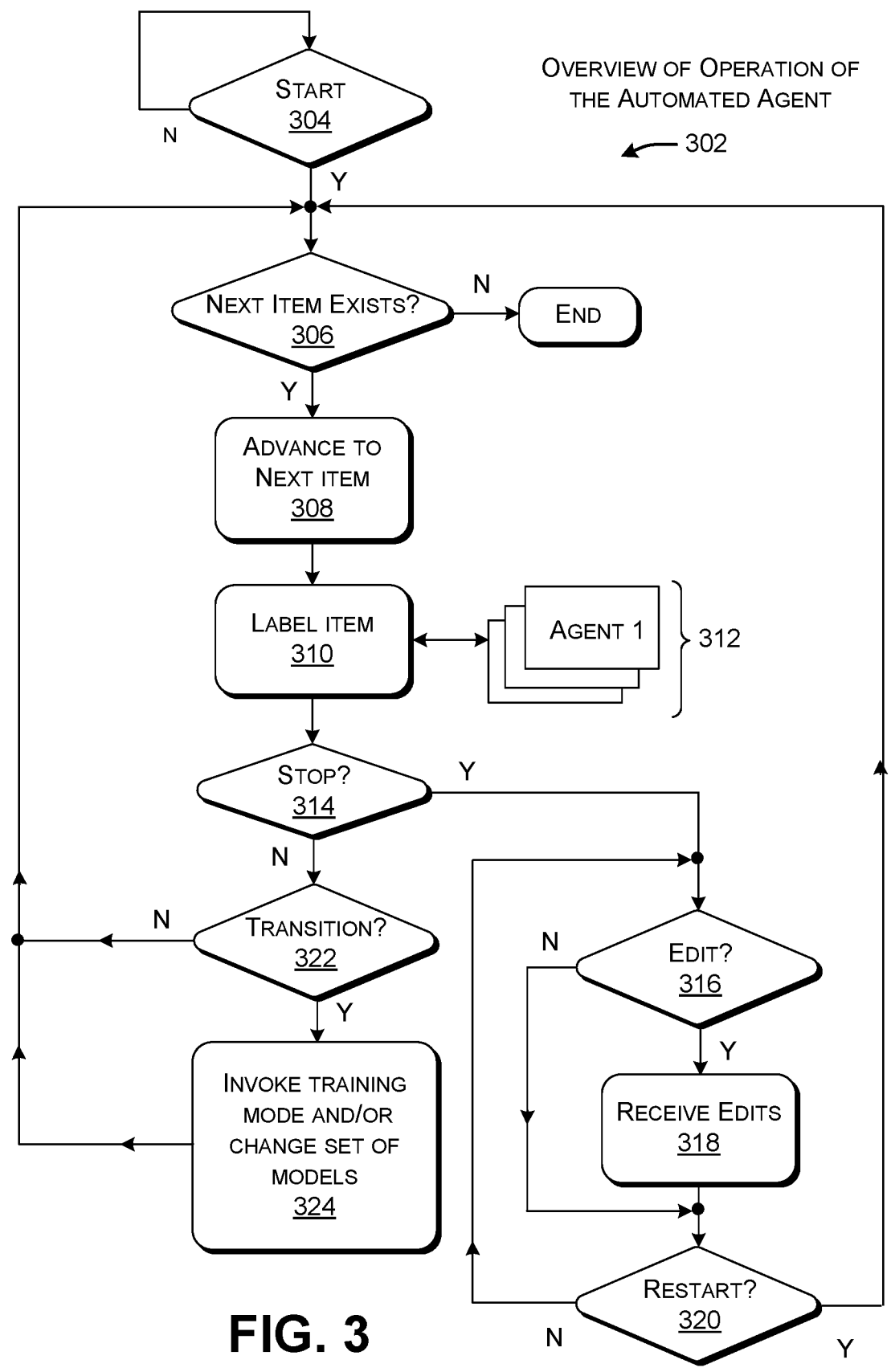
FIG. 3 is a flowchart that shows one manner of operation of the computer-implemented agent that produces the user interface presentation of FIG. 2

FIG. 3 shows a process 302 in flowchart form that represents one manner of operation of the labeling control system 114 of FIG. 1, and which produces the user interface presentation 202 shown in FIG. 2. In block 304, the labeling control system 114 detects whether the user has invoked a labeling run, e.g., by activating the graphical control 224. As noted above, a labeling run is able to commence independent of the existence of manually labeled items because it is not dependent on manually labeled items, but rather leverages the statistical patterns embodied in the language model's trained weights. In block 306, the labeling control system 114 detects if there is a next item to label. If not, the labeling control system 114 terminates the labeling run. If there is a next item, the labeling control system 114 advances to the next item. In block 310, the labeling control system 114 uses one or more labeling agents 312 to label the current item. The agents 312 include one or more language models and/or any number of human agents.

In block 314, the labeling control system 114 detects whether the user has paused the labeling run, e.g., by activating the graphical control 226. If so, then in block 316, the labeling control system 114 detects whether the user has chosen to edit the setup information entered via the section 204 of FIG. 4. If so, in block 318, the labeling control system 114 receives the user's edits. In block 320, the labeling control system 114 detects whether the user has resumed the labeling run, e.g., by activating the graphical control 224. If so, the flow of the process 302 advances back to block 306.

Alternatively assume that block 314 is answered in the negative (indicating the user has not paused the labeling run). In block 322, the labeling control system 114 determines whether a predefined transition point has been reached, such as the labeling of a prescribed number of items. If so, in block 324, the labeling control system 114 invokes whatever action is associated with the transition point. In one example, for instance, the labeling control system 114 instructs the training system 110 to begin training the model 112. In another example, the labeling control system 114 transitions from a first subset of agents to a second subset of agents. For example, a user configures the labeling control system 114 to use a first language model in a first stage. The user leverages the results produced by this language model to iteratively adjust the task description 118. After a prescribed number of items have been labeled, and/or after a prescribed performance goal is achieved, the labeling control system 114 advances to a second stage, in which the labeling control system 114 interacts with a second language model to classify the remaining items. In some implementations, the second language model is smaller and less capable than the first language model, but is smaller, faster (having lower latency), and less expensive than the first language model. Other environments make use of different labeling stages.

FIG. 3 is a case in which the labeling control system 114 processes items in series. Alternatively, or in addition, the labeling control system 114 processes items in parallel using plural computing instances.

The use the automated agent in conjunction with the user interface presentation 202 facilitates and expedites a user's changes to a labeling run in a highly responsive manner. The automated agent accomplishes this result by providing a single integrated interface by which a user can conveniently pause a labeling run without aborting the labeling run in wholesale fashion, inspect the classification results produced thus far and the performance of the language model(s), make corrective action if deemed appropriate to the labeling run, and then resume the labeling run from the point at which it was paused. This is contrast to an alternative approach in which a user is given no ability to change control instructions during a labeling run. In the alternative technique, stopping a labeling run requires entirely aborting a labeling run and starting over. This alternative process consumes more time and processing resources compared to the automated agent described herein. In some implementations, the alternative process also does not give the user immediate visibility as to the impact of a task description during a labeling run; in a traditional manner, a user performs ad hoc validation studies only after the entire set of items has been processed, and the usefulness of such validation studies is not always assured.

C. Illustrative Task Description

Figure 4:
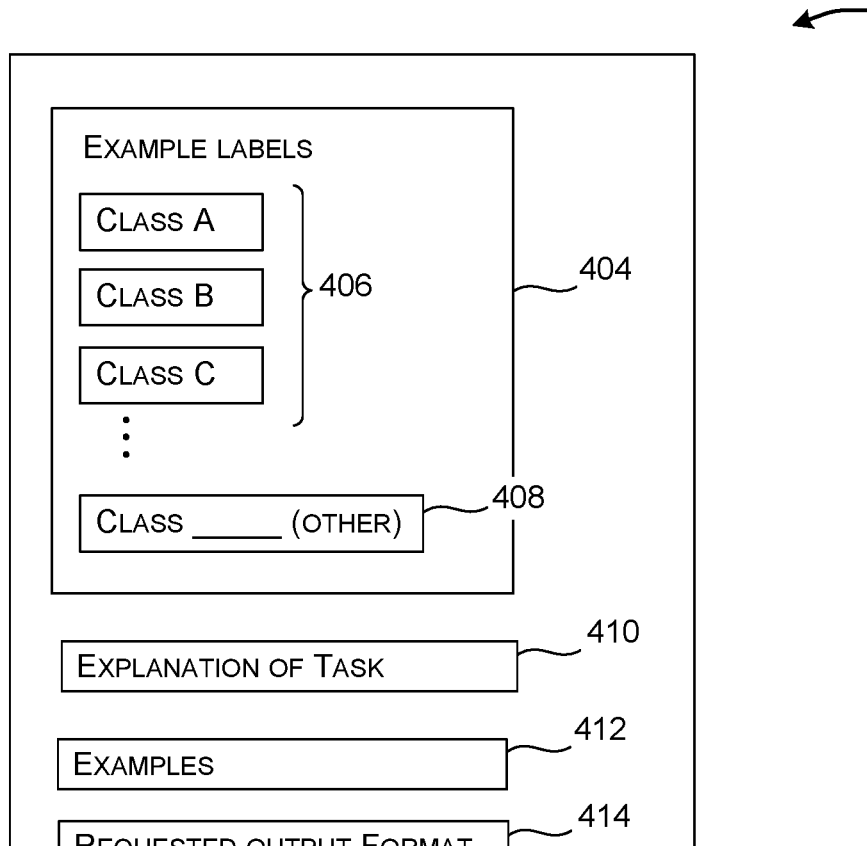
FIG. 4 shows representative information provided in a task description generated by the computing system of FIG. 1.

FIG. 4 shows an overview of an illustrative task description 402. The task description 402 includes text having various sections. An optional first section 404 specifies a group of predefined classes 406, generically designated in FIG. 4 as class A, class B, class C, etc. The list of classes 406 also has an entry 408 that generically represents any new class that the language model 104 may detect during its operation. A second section 410 provides an explanation of the task that the language model 104 is being requested to perform. In some cases, the explanation also explicitly requests the language model 104 to set forth the "reasons" that it has selected a particular task. For example, the explanation provides a general directive to "give a detailed response that sets forth the reason for the classification." A third section 412 optionally provides examples that demonstrate how the task is correctly performed. For example, a representative example specifies an input prompt and a correct classification of the input prompt. A fifth section 414 specifies the format that the language model 104 is requested to provide its conclusion. Other task descriptions include additional types of information, and/or omit one or more of the types of information shown in FIG. 4, and/or organize the types of information in a different manner than what is shown in FIG. 4.

FIG. 5 shows an illustrative task description 502 that includes many of the sections described above with respect to FIG. 4. The overall objective of the task description 502 is to instruct the language model 104 to classify a disease exhibited by a particular image of a grape leaf, if any. A first section 504 specifies a predefined group of diseases. The first section 504 also includes an open-end entry that allows for any new disease that may be identified by the language model 104 during its execution.

A second section 506 provides an explanation of the task. For instance, a "Question" subsection 508 sets forth the main directive of the task description 502. In this example, the "Question" subsection 508 also includes a request that reads: "Provide an explanation of your decision." This text induces the language model 104 to explain the basis of its classification. A "Hints" subsection 510 provides a synopsis of the visible characteristics of different diseases in the list of predetermined diseases. Note that the language model 104 will also rely on any "internal" knowledge that is embodied in its weights in choosing classes. The language model 104 will interpret the diseases listed in the "Hints" subsection 510 as illustrative and non-exhaustive based on the instruction to that effect in the "Question" subsection 508.

A third section 512 instructs the language model 104 to provide its response in a particular format. A fourth section 514 specifies two parameters that govern the operation of the language model 104. A first parameter requests the language model 104 to accept task descriptions having a maximum token count of 512. A second parameter specifies a "temperature" hyper-parameter, which controls the randomness at which the language model 104 generates its predictions. Although not shown in FIG. 5, the task description 502 can also include representative examples.

D. Illustrative Implementation of the Labeling Control System

Figure 6:
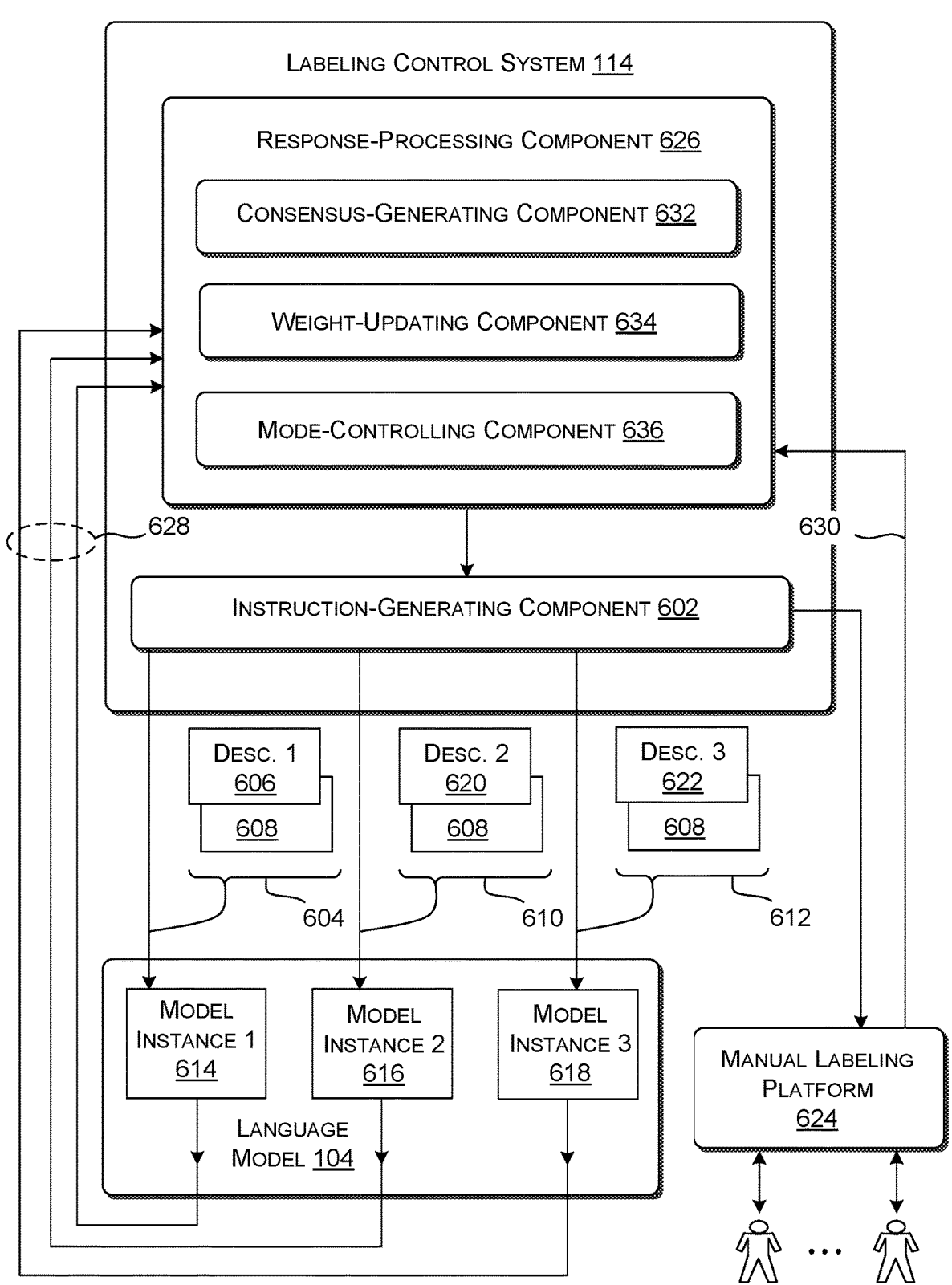
FIG. 6 shows one implementation of a labeling control system, which is a component of the computing system of FIG. 1.

FIG. 6 shows one implementation of the labeling control system 114. The labeling control system 114 includes an instruction-generating component 602 for producing prompts. More specifically, in some implementations, the instruction-generating component 602 produces a single prompt that is sent to a single language model 104. For example, an illustrative prompt 604 includes a task description 606 accompanied by a particular item 608.

In other examples, the instruction-generating component 602 sends plural prompts to plural language models. FIG. 6 specifically shows an example in which the instruction-generating component 602 sends three prompts (604, 610, 612) to three respective model instances (614, 616, 618) of the language model 104. For example, the language model 106 implements the model instances (614, 616, 618) using separate processing threads of a graphics processing unit (GPU) and/or separate processors provided by the GPU. In other implementations, the computing system 102 sends at least two of the three prompts (604, 610, 612) to different kinds of language models that use different sets of weights.

In some implementations, the instruction-generating component 602 constructs different task descriptions (606, 620, 622) for use in the three respective prompts (604, 610, 612). For example, the task descriptions (606, 620, 622) differ from each other in one or more of the following respects: a) the use of different explanations of the task; and/or b) the use of different sets of predefined classes; and/or c) the use of different sets of examples. The prompts (604, 610, 612) include the same item 608. The labeling control system's overall objective in using different task descriptions (606, 620, 622) is to solicit different responses from the model instances (614, 616, 618). In some implementations, the labeling control system 114 leverages these different responses to more quickly and effectively discover the optimum composition of a task description to use in labeling the items. The labeling control system 114 uses this insight to progressively modify the task descriptions (606, 620, 622) as a labeling run proceeds. The review section 208 facilitates this task by showing a side-by-side comparison the classification results and/or accuracy of different models.

In addition, the instruction-generating component 602 sends one or more task descriptions to a manual labeling platform 624. The task description(s) provide guidance to human agents in how to manually classify items. The manual labeling platform 624 is a computer program that presents the task description(s), presents the items, and receives the user's input that conveys their manual classifications. For example, the manual labeling platform 624 represents a server-implement computer program. Geographically dispersed human agents interact with the server-implemented computer program via respective local devices. In other implementations, the manual labeling platform 624 represents local computer programs running on local devices. A general reference to an "agent" below refers to either a language model or a human agent.

A response-processing component 626 receives one or more responses 628 from the language model 104 and optionally one or more responses 630 from the manual labeling platform 624. The response-processing component 626 performs one more functions, depending on the objectives of a particular implementation. In some implementations, a consensus-generating component 632 determines a final class to be assigned to the particular item 608 based on any type of combination of combination of classes associated with plural responses received from the language model 104 and/or the manual labeling platform 624. For example, the consensus-generating component 632 tallies the number of times each class is detected in the received responses (628, 630), and selects the class with highest count, or randomly selects a class if two or more classes have the same count.

In other examples, the consensus-generating component 632 modifies each "vote" for a particular class by a weighting factor associated with the model instance or human agent which has detected the class. The weighting factor describes the level of confidence associated with the model instance or human agent. For example, a large language model with a large number of parameters will generally produce more accurate results than a smaller language model having fewer parameters. Hence, the large language model will have a weight which promotes its conclusions over the smaller language model. Similarly, different human agents have different reputations for accuracy, depending, for instance, on the amount of time that different human agents are given to enter their classifications. In connection therewith, a weight-updating component 634 adjusts the weights assigned to different model instances and human agents based on prevailing evidence of their performance. Further information regarding the operation of the weight-updating component 634 is set forth below in connection with FIG. 8.

A mode-controlling component 636 controls the transition between modes depending on various triggering events. The user defines these triggering events via section 204 of the user interface presentation 202 of FIG. 2. For example, the mode-controlling component 636 instructs the training system 110 to begin training the model 112 once a prescribed number of items have been labeled, and/or when one or more performance metrics are satisfied. In some implementations, this decision is made based on a response received from the language model 104 itself, which provides the language model's judgment that a transition point has been reached. In turn, the language model 104 is configured to make such a recommendation based on instructions contained in the task description given to it. The language model 104 also makes this judgment based on context information fed to it, which includes the series of items it has classed so far. In other words, the language model 104 is given visibility into its own performance, as reflected by its prior responses, each time it is presented with a new item to classify.

In another case, the model-controlling component 636 modifies its use of model instances and/or human agents as a labeling run proceeds. For example, the model-controlling component 636 transitions from a large expensive language model to a smaller less expensive language model as training proceeds. The labeling control system 114 leverages the large expensive language model in a beginning stage for the purpose of quickly determining a suitable task description to use in interacting with the language model 602. Once discovered, the labeling control system 114 opts to use the smaller and quicker language model in lieu of its larger more expensive counterpart. This is based on the expectation that the smaller language model will also provide acceptable classification results for the same task description developed using the larger language model. A user can define such a transition point in any manner, e.g., by creating a setting via the user interface presentation 202 that will cause a transition from a first language model to a second language model once the accuracy of the first language model reaches a prescribed threshold, or once the first language model has produce a prescribed number of responses, or based on any combination of the above two measures.

Figure 7:
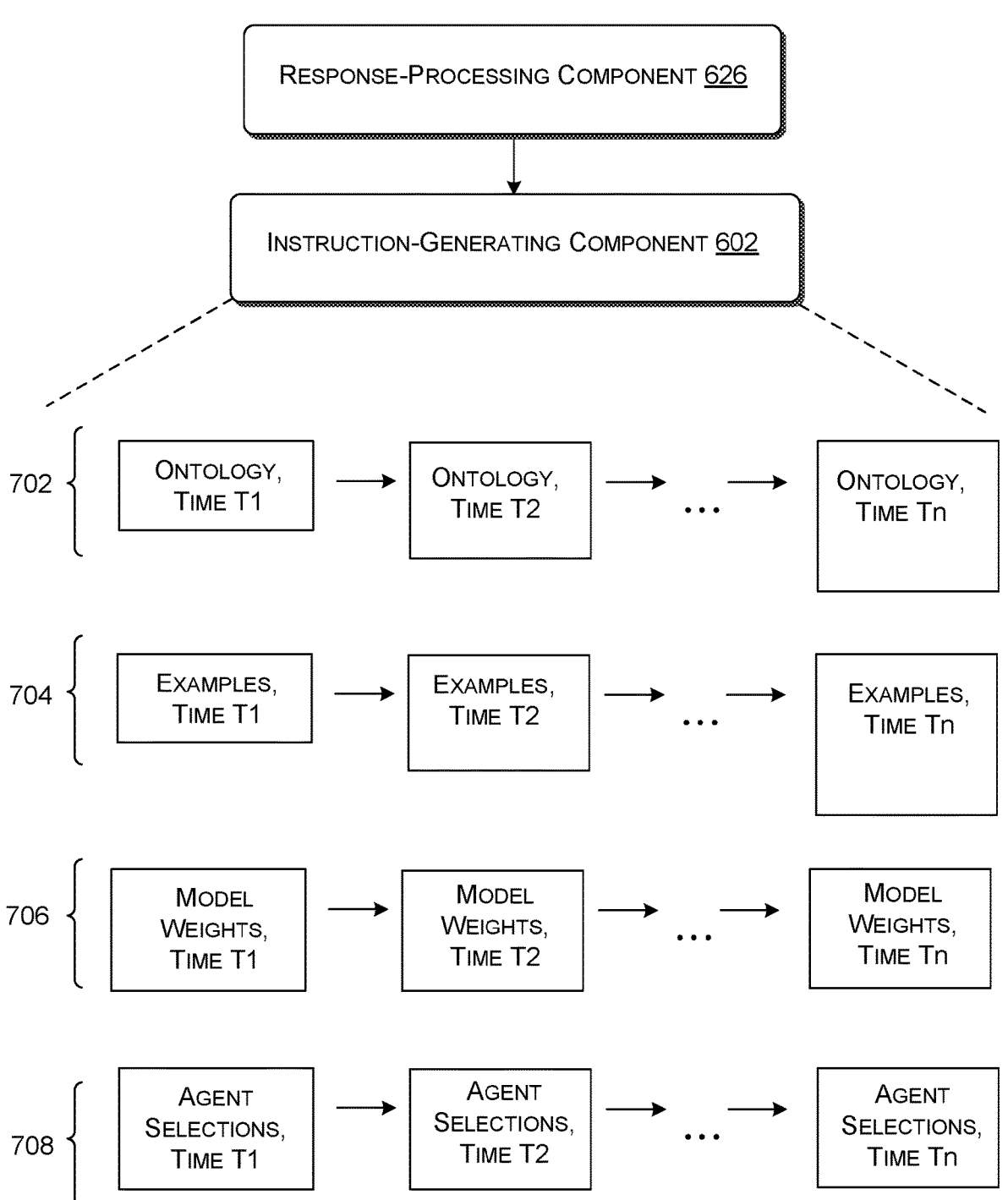
FIG. 7 illustrates how the labeling control system of FIG. 6 adjusts various aspects of the operation of the computing system of FIG. 1 over one or more labeling runs.

FIG. 7 illustrates various ways in which the instruction-generating component 602 of FIG. 6 is capable of adjusting one or more task descriptions based on information presented in the responses received so far in a labeling run. In a first example 702, the instruction-generating component 602 progressively modifies the ontology specified by the task description, e.g., by using a first ontology at time T1, a second ontology at time T2, and an $n^{th}$ ontology at time Tn. The ontology is given by set of predefined classes specified by the task description. In some implementations, the instruction-generating component 602 adds a new class to an ontology if a prescribed number of responses or a prescribed percentage of responses have detected this new class. This will overall cause the size of the ontology to increase over time. In addition, or alternatively, the instruction-generating component 602 removes a class from an existing ontology if this class is not detected in a sufficient number of responses.

In other implementations, the instruction-generating component 602 adds a new class by: computing a first score that expresses a total number of responses from any language model that specify the new class; computing a second score that expresses a diversity of different language models that have detected the new class; and producing a final score that is some weighted combination of the first score and the second score. Illustrative ways of combining scores include linear weighted combinations, non-linear combinations, combinations performed by a machine-trained model, and so on. A decision about whether to add the new class is based on the final score. In some cases, the second (diversity) score is any type of metric that characterizes a histogram of the number of times different language models have detected the new class. One diversity measure is standard deviation among counts. An indication that many different language models consistently detected the new class is evidence that the new class should be added.

In a second example 704, the instruction-generating component 602 progressively modifies the examples over time as a labeling run proceeds based on the responses received so far, e.g., by using a first set of examples at time T1, a second set of examples at time T2, and an $n^{th}$ set of examples at time Tn. Each example provides an illustrative case in which an input prompt is transformed into a correct response. In one example, the instruction-generating component 602 mines the examples it adds to the task description based on the classification results produced by a large expensive machine-trained model. These examples are helpful in guiding a smaller, faster, and less expensive machine-trained model to provide correct results.

In a third example 706, the instruction-generating component 602 modifies the weights associated with the different language models and/or human agents, e.g., by using a first set if weights at time T1, a second set of weights at time T2, and an $n^{th}$ set of weights at time Tn. In one application, the consensus-generating component 632 uses a prevailing set of weights as weighting factors to increase or decrease the relevance of classifications made by particular language models or human agents. The instruction-generating component 602 adjusts the weights based on the assessed accuracy of each model's classification results, e.g., by increasing each weight as the accuracy increases, and decreasing the weight as the accuracy decreases. Different implementations carry out this adjustment in different ways, including a linear function, a non-linear function, or a machine-trained transformation of accuracy information to a value, etc.

In a fourth example 708, the instruction-generating component 602 modifies its choice of labeling agents over time, e.g., by using a first set of agents at time T1, a second set of agents at time T2, and an $n^{th}$ set of agents at time Tn. ("Agents" here refers to language models and/or human agents.) In some implementations, for example, the instruction-generating component 602 ceases interacting with a language model or human agent that is producing classification results that fail to meet a threshold level of quality. At other times, the instruction-generating component 602 varies its selection of agents in a staged manner, e.g., by transitioning from large expensive language models to smaller, faster, and less expensive models in the manner described above.

Figure 8:
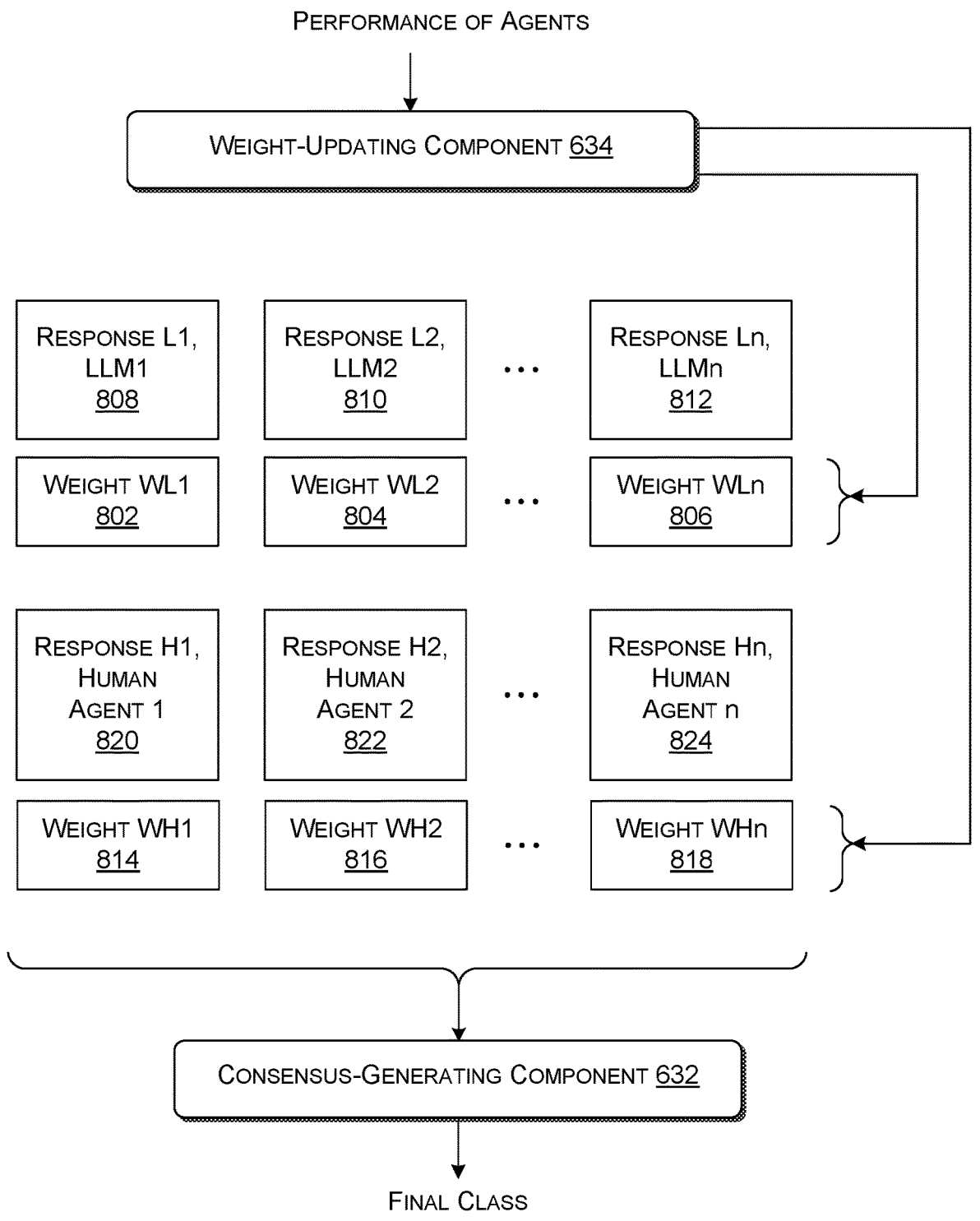
FIG. 8 elaborates on one aspect of FIG. 7, showing how the labeling control system of FIG. 4 adjusts weights over one or more labeling runs.

FIG. 8 shows a more detailed implementation of how the response-processing component 626 adjusts weights over the course of a labeling run. The weight-updating component 634 receives performance information which reflects the accuracy of classifications made by different agents (e.g., different language models and/or human agents). More specifically, in some cases, the performance information reflects the evaluation of human experts. Alternatively, or in addition, the performance information expresses the evaluation of an authoritative language model, such as the output results of a large language model that produces classification results having a high degree of accuracy. Other implementations rely on other sources of validation/guidance information, such as publicly available ground-truth validation sets and network-accessible reference sources. The weight-updating component 634 generates a weight for each agent based on its performance, e.g., by computing a score that depends on the accuracy of the agent, normalized by accuracy measures associated with all of the agents. As noted above, the transformation of accuracy information to weights is a linear transformation, a non-linear transformation, a machine-trained transformation, etc. As a result of these computations, the weight-updating component 634 produces weights (802, 804, 806) associated with responses (808, 810, 812) produced by different language models, and/or weights (814, 816, 818) associated with responses (820, 822, 824) produced by different human agents.

The consensus-generating component 632 uses these weights in determining a final class to assign to a particular item. For instance, the consensus-generating component 632 computes a weighted count of the number of times that the agents have detected each class, and then selects the class having the highest score. If there are two or more classes having the same final score, the consensus-generating component 632 randomly select one of these classes.

Other implementations of the labeling control system 114 use other functionality not represented by FIGS. 6-8, and/or omit part of the functionality shown in FIGS. 6-8. For instance, in one implementation, in addition to assigning a class to an entity in an item, the language model 104 provides more elemental feature information that describes the entity. For instance, the entity is an object in an image to be classified. In some examples, the feature information describes a bounding box that encloses the object in an image. Alternatively, the feature information is an output embedding that characterizes the shape of the object, the color of the object, etc. The consensus-generating component 632 produces final feature information based on any summation of individual estimates of the feature information produced by different language models, e.g., by computing an average of the individual estimates. The training system 110 also uses the feature information in its training of the model 112.

In another implementation, the labeling control system 114 orchestrates an analysis flow including any combination of different types of models and/or other analysis tools, in addition to the language model 104. In some implementations, the labeling control system 114 determines whether to invoke a particular model or analysis tool based on control information specified in a response by the language model 104. This constitutes a manifestation of function-calling. Illustrative models and analysis tools include specialized machine-trained models (e.g., specialized image classification models), database lookup operations, and so on. For example, assume that the language model 104 reaches a conclusion it is having difficulty in discriminating between two types of grape leaf diseases. In response, the language model 104 provides a response that includes a properly formatted application programming interface (API) call. The labeling control system 114 invokes this API call to harvest more images from an image repository regarding the diseases in question.

Alternatively, the labeling control system 114 invokes an API or other manifestation of control information to consult with a more capable language model (a second language model) compared to the language model that is currently being used (a first language model). As explained above, however, the second language model, may represent a larger and more resource-intensive engine, and may incur higher costs to use compared to the first language model. The transition from the first language model to the second language model proceeds as follows: (a) receiving control information from the first language model that contains control information that signals a request to interact with the second language model because the first language model determines that it is unable to classify a particular item with sufficient confidence; (b) executing the control information to send the particular item to the second language model; and (c) receiving a response from the second language model in response to the executing. In some implementations, a low confidence score occurs when the class having the highest probability (e.g., as assessed via a Softmax calculation) is below a prescribed threshold.

In another implementation, in a crowdsource mode, plural "child" labeling control systems operate on subsets of the items in the data store 106. A "parent" labeling control system combines the responses separately produced by the child labeling control systems. The child labeling control systems also share ontologies, examples, weights, etc.

In another implementation, the language model 104 is used to assist a human labeler in classifying an item. For instance, a user may activate a graphical control to invoke the language model 104 when reviewing the item on a display device. The user uses the class specified by the language model 104 as guidance in manually classifying the item.

In another implementation, the language model 104 provides control information that controls training performed by the training system 110. For example, the labeling control system 114 feeds information to the language model 104 that conveys the current performance of the model 112 in its current state. In response, the language model 104 offers its judgment as to whether there are any classes that the model 112 cannot yet detect with sufficient accuracy. In further response, the language model 104 provides output information that suggests a course of action to improve the quality of the model 112. For example, the language model 104 requests the labeling control system 114 to provide additional examples to the training system 110 regarding a particular class. This is an application of active learning.

In another implementation, the language model 104 offers its judgment as to changes in the task description 118 that is fed to it by the labeling control system 114. In so doing, the language model 104 critics its own performance, and suggests actions that can be taken to improve its performance. This is a manifestation of self-learning.

E. Illustrative Language Model

Figure 9:
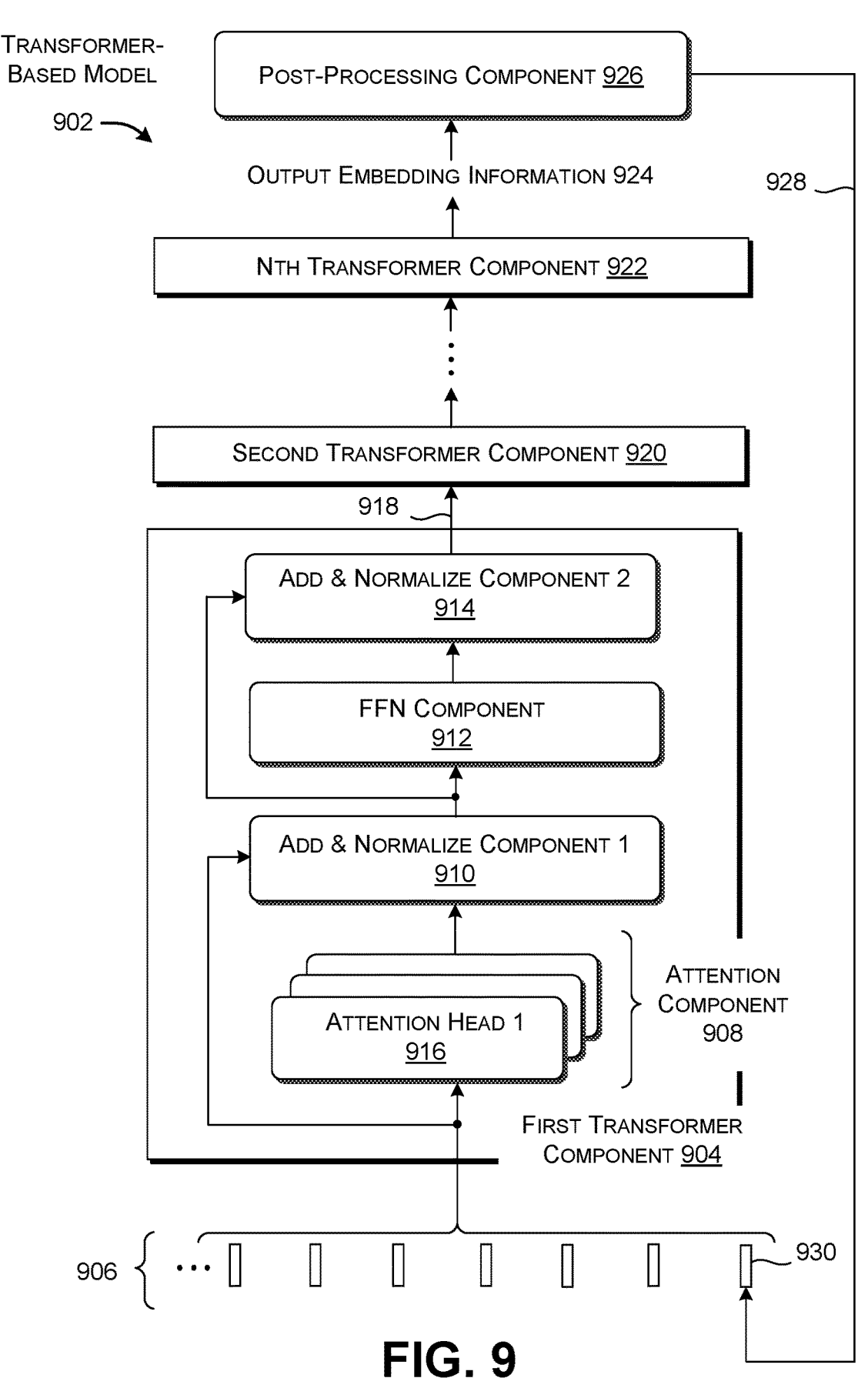
FIG. 9 shows an illustrative language model for implementing various functions of the computing system of FIG. 1.

FIG. 9 shows a transformer-based language model ("language model") 902 for implementing the language model 104 referenced by FIG. 1. The language model 902 is composed, in part, of a pipeline of transformer components, including a first transformer component 904. FIG. 9 provides details regarding one way to implement the first transformer component 904. Although not specifically illustrated, other transformer components of the language model 902 have the same architecture and perform the same functions as the first transformer component 904 (but are governed by separate sets of weights).

The language model 902 commences its operation with the receipt of input information, such as a passage of text and/or any non-text content (such as an image). The prompt includes a series of tokens. With respect to text-based input information, a "token" refers to a unit of text or other content having any granularity, such as an individual word, a word fragment produced by byte pair encoding (BPE), a character n-gram, a word fragment identified by the WordPiece or SentencePiece algorithm, etc. With respect to image content, tokens sometimes refer portions of an image of size n×m pixels, where n and m are any environment-specific parameters. General background on this type of approach is provided in Dosovitskiy, et al., in "An Image is Worth 16×16 Words: Transformers for Image Recognition at Scale," arXiv: 2010.11929v2 [cs.CV], Jun. 3, 2021, 22 pages.

Next, an embedding component (not shown) maps the sequence of tokens into respective token embeddings. For example, for the case of text-based tokens, the embedding component produces one-hot vectors that describe the tokens, and maps the one-hot vectors into the token embeddings using a neural network of any type. For the case of image-based tokens, in some implementations, the embedding component uses a neural network of any type to map each n×m portion into an image vector. The embedding component then adds position information (and, in some cases, segment information) to the respective token embeddings to produce position-supplemented embedding vectors 906. The position information added to each token embedding describes the embedding vector's position in the sequence of token embeddings.

The first transformer component 904 operates on the position-supplemented embedding vectors 906. In some implementations, the first transformer component 904 includes, in order, an attention component 908, a first add-and-normalize component 910, a feed-forward neural network (FFN) component 912, and a second add-and-normalize component 914.

The attention component 908 determines how much emphasis should be placed on parts of input information when interpreting other parts of the input information. Consider, for example, a sentence that reads: "I asked the professor a question, but he could not answer it." When interpreting the word "it," the attention component 908 will determine how much weight or emphasis should be placed on each of the words of the sentence. The attention component 908 will find that the word "question" is most significant.

The attention component 908 performs attention analysis using the following equation:

$$\text{Attention } (Q, K, V) = \text{softmax} \left( \frac{QK^T}{\sqrt{d_k}} \right) V. \qquad (1)$$

The attention component 908 produces query information Q by multiplying the position-supplemented embedding vectors 906 by a query weighting matrix $W^Q$. Similarly, the attention component 908 produces key information K and value information V by multiplying the position-supplemented embedding vectors 906 by a key weighting matrix $W^K$ and a value weighting matrix $W^V$, respectively. To execute Equation (1), the attention component 908 takes the dot product of Q with the transpose of K, and then divides the dot product by a scaling factor $\sqrt{d}$, to produce a scaled result. The symbol d represents the dimensionality of Q and K. The attention component 908 takes the Softmax (normalized exponential function) of the scaled result, and then multiplies the result of the Softmax operation by V, to produce attention output information. More generally stated, the attention component 908 determines how much emphasis should be placed on each part of input embedding information when interpreting other parts of the input embedding information, and when interpreting the same part. In some cases, the attention component 908 is said to perform masked attention insofar as the attention component 908 masks output token information that, at any given time, has not yet been determined. Background information regarding the general concept of attention is provided in Vaswani, et al., "Attention Is All You Need," in 31st Conference on Neural Information Processing Systems (NIPS 2017), 2017, 9 pages.

Note that FIG. 9 shows that the attention component 908 is composed of plural attention heads, including a representative attention head 916. Each attention head performs the computations specified by Equation (1), but with respect to a particular representational subspace that is different than the subspaces of the other attention heads. To accomplish this operation, the attention heads perform the computations described above using different respective sets of query, key, and value weight matrices. Although not shown, the attention component 908 concatenates the output results of the attention component's separate attention heads, and then multiplies the results of this concatenation by another weight matrix $W°$.

The add-and-normalize component 910 includes a residual connection that combines (e.g., sums) input information fed to the attention component 908 with the output information generated by the attention component 908. The add-and-normalize component 910 then normalizes the output information generated by the residual connection, e.g., by layer-normalizing values in the output information based on the mean and standard deviation of those values, or by performing root-mean-squared normalization. The other add-and-normalize component 914 performs the same functions as the first-mentioned add-and-normalize component 910. The FFN component 912 transforms input information to output information using a feed-forward neural network having any number of layers.

The first transformer component 904 produces output embedding information 918. A series of other transformer components (920, . . . , 922) perform the same functions as the first transformer component 904, each operating on output embedding information produced by its immediately preceding transformer component. Each transformer component uses its own level-specific set of machine-trained weights. The final transformer component 922 in the language model 902 produces final output embedding information 924.

In some implementations, a post-processing component 926 performs post-processing operations on the final output embedding information 924. For example, the post-processing component 926 performs a machine-trained linear transformation on the final output embedding information 924, and processes the results of this transformation using a Softmax component (not shown). The language model 902 uses the output of the post-processing component 926 to predict the next token in the input sequence of tokens. In some applications, the language model 902 performs this task using a greedy selection approach (e.g., by selecting the token having the highest probability), or by using the beam search algorithm (e.g., by traversing a tree that expresses a search space of candidate next tokens).

In some implementations, the language model 902 operates in an auto-regressive manner, as indicated by the loop 928. To operate in this way, the language model 902 appends a predicted token to the end of the sequence of input tokens, to provide an updated sequence of tokens. The predicted token leads to the production of a new position-supplemented vector 930. In a next pass, the language model 902 processes the updated sequence of position-supplemented vectors to generate a next predicted token. The language model 902 repeats the above process until it generates a specified stop token.

The above-described implementation of the language model 902 relies on a decoder-only architecture. Other implementations of the language model 902 use an encoder-decoder transformer-based architecture. Here, a transformer-based decoder receives encoder output information produced by a transformer-based encoder, together with decoder input information.

In some implementations, the language model 902 is a publicly-available pre-trained language model. One example of a publicly-available language model is described in Touvron, et al., "LLaMA: Open and Efficient Foundation Language Models," arXiv, arXiv: 2302.13971v1 [cs. CL], Feb. 27, 2023, 27 pages. Another example of a publicly-available pre-trained model language model is the BLOOM model described in Scao, et al., "BLOOM: A 176B-Parameter Open-Access Multilingual Language Model," arXiv, arXiv: 2211.05100v2 [cs.CL], Dec. 11, 2022, 62 pages. In some examples, the pre-training of a generative language model includes unsupervised training using language modeling (e.g., predicting the next word in a given text passage and comparing the prediction with the actual next word) and supervised training (e.g., predicting an output result and comparing the prediction with a ground-truth result). One example of a publicly-accessible multi-modal language model that is capable of processing input images is GPT-4V, available from OpenAI, San Francisco, California. Background on the general task of pre-training generative language models is provided in Radford, et al., "Improving Language Understanding by Generative Pre-training," OpenAI, San Francisco California, Jun. 11, 2018, 12 pages.

In other examples, a training system fine-tunes the pre-trained language model for specific use in the computing system 102 of FIG. 1. The training system performs fine-tuning in the present case by generating a training set of examples; each positive example specifies an item, an input prompt, and a ground-truth classification of the input item based on the prompt. In some cases, the ground-truth classification of a training example is not a member of a list of candidate classifications specified by the input prompt; this fosters the ability of the language model to predict new classes. The training system performs supervised learning on this data set by progressively decreasing the distance between input items (and associated prompts) and classifications considered correct. Differences are expressible using any loss function, such as cross entropy.

In some examples, the language model 902 is also trained to provide a satisfactory explanation of each classification, in a process referred to as explanation tuning. A training system performs training in this manner in the present case by generating a training set of examples that include explanations. That is, each positive example specifies an item, an input prompt that requests the language model to provide a detailed explanation, and a ground-truth response of the input item based on the prompt that: (a) provides a correct classification; and (b) provides an acceptable explanation of how the correct classification is derivable (e.g., by explaining what visual attributes of an image were used to make a classification and/or how a chosen class was distinguished over competing classes). The training system performs supervised learning on this data set in the manner described above, e.g., by progressively decreasing the distance between input items and classifications considered correct (and fulsome). Explanation tuning is described in the co-pending and commonly assigned U.S. Provisional Application No. 63/538,548 (the '548 application) to Ahmed AWADALLAH, filed on Sep. 15, 2023, and entitled "Producing a Reduced-Size Model by Explanation Tuning." The '548 application is incorporated by reference herein in its entirety.

Note that the above types of fine-tuning require a preparatory training set, but this training set is for the purpose of training a language model that is project-agnostic in the sense that it is capable of operating on any labeling task once trained. Thus, the user is freed from the task of creating a training set for each labeling project. Again, the use of a fine-tuned model is optional; in other implementations, the computing system 102 uses a publicly-available pre-trained language model without fine-tuning it.

Other implementations of the language model 902 use other kinds of machine-trained models besides, or in addition to, the particular transformer-based architecture shown in FIG. 9. The other machine-trained models include any of CNNs, RNNs, fully-connected feed-forward neural networks (FFNS), stable diffusion models, etc., or any combination thereof. In yet another implementation, the language model 104 of FIG. 1 is implemented as a transformer-based classification model (such as a BERT-based classification model) which detects the most probable class associated with a given prompt.

F. Illustrative Processes

FIGS. 10-12 show three processes that represent an overview of the operation of the computing system of FIG. 1. Each of the processes is expressed as a series of operations performed in a particular order. But the order of these operations is merely representative, and the operations are capable of being varied in other implementations. Further, any two or more operations described below can be performed in a parallel manner. In one implementation, the blocks shown in the processes that pertain to processing-related functions are implemented by the computing equipment described in connection with FIGS. 13 and 14.

More specifically, FIG. 10 shows a first process 1002 controlling the labeling of items using a computer-implemented agent. In block 1004, the computing system 102 receives a first input that specifies a language model (e.g., the language model 104) to use in labeling items in a set of items. In block 1006, the computing system 102 receives a second input that specifies a task description to be given to the language model. The task description describes a group of classes to be used to label the items in the set of items. The task description also provides an instruction to the language model to specify another class upon determining that none of the group of classes applies to the particular item. In block 1008, the computing system 102 receives an instruction to commence a labeling run based on the items in the set of items. In block 1010, in response to receiving the instruction to commence, for a particular item of the set of items, the computing system 102 performs a language model interaction by sending the task description and the particular item to the language model, and receiving a response generated by the language model based on the task description and the particular item. The response specifies a particular class associated with the particular item. The loop 1012 indicates that the computing system 102 repeats the language model interaction of block 1010 for other items in the set of items. In block 1014, the computing system 102 receives an instruction to pause the labeling run prior to the language model labeling all of the items in the set of items. In block 1016, the computing system 102 receives an instruction to review responses produced by the language model for one or more of the items in the set of items.

FIG. 11 shows a second process 1102 for labeling items. In block 1104, in a language model interaction, the computing system 102 sends a task description and a particular item in a set of items to a language model (e.g., the language model 104). The task description describes a group of classes to be used in labeling the particular item. The task description also provides an instruction to the language model to specify another class upon determining that none of the group of classes applies to the particular item. In block 1106, as part of the language model interaction, the computing system 102 receives a response generated by the language model based on the task description and the particular item. The response specifies a particular class associated with the particular item. The loop 1108 indicates that the computing system 102 repeats the language model interaction of blocks 1104 and 1106 for other items in the set of items, to provide plural responses. In block 1110, the computing system determines, based on the responses, that an additional class, not among the group of labels, satisfies a prescribed test. In block 1112, the computing system 102 updates the group of classes in the task description to include the additional label.

FIG. 12 shows a third process 1202 for labeling items. In block 1204, the computing system 102 sends plural task descriptions to plural language models, together with a particular item of a set of items. A particular task description of the plural task descriptions describes a particular group of classes to be used to label the particular item. Further, at least two task descriptions of the plural task descriptions differ from each other. In block 1206, the computing system 102 receives responses generated by the plural language models based on the plural task descriptions and the particular item. The responses include particular classes specified by the plural language models associated with the particular item. In block 1208, the computing system 102 determines a final class for the particular item based on the particular classes generated by the plural language models.

G. Illustrative Computing Functionality

FIG. 13 shows computing equipment 1302 that, in some implementations, is used to implement the computing system 102. The computing equipment 1302 includes a set of local devices 1304 coupled to a set of servers 1306 via a computer network 1308. Each local device corresponds to any type of computing device, including any of a desktop computing device, a laptop computing device, a handheld computing device of any type (e.g., a smartphone or a tablet-type computing device), a mixed reality device, an intelligent appliance, a wearable computing device (e.g., a smart watch), an Internet-of-Things (IoT) device, a gaming system, an immersive "cave," a media device, a vehicle-borne computing system, any type of robot computing system, a computing system in a manufacturing system, etc. In some implementations, the computer network 1308 is implemented as a local area network, a wide area network (e.g., the Internet), one or more point-to-point links, or any combination thereof.

The bottom-most overlapping box in FIG. 13 indicates that the functionality of the computing system 102 is capable of being spread across the local devices 1304 and/or the servers 1306 in any manner. In one example, the computing system 102 is entirely implemented by a local device. In another example, the functions of the computing system 102 are entirely implemented by the servers 1306. Here, a user interacts with the servers 1306 via a browser application running on a local device. In other examples, some of the functions of the computing system 102 are implemented by a local device, and other functions of the computing system 102 are implemented by the servers 1306. In some implementations, for instance, the language model 104 is implemented by the servers 1306, and the remainder of the functions of the computing system 102 are implemented by each local device.

FIG. 14 shows a computing system 1402 that, in some implementations, is used to implement any aspect of the mechanisms set forth in the above-described figures. For instance, in some implementations, the type of computing system 1402 shown in FIG. 14 is used to implement any local computing device or any server shown in FIG. 13. In all cases, the computing system 1402 represents a physical and tangible processing mechanism.

The computing system 1402 includes a processing system 1404 including one or more processors. The processor(s) include one or more central processing units (CPUs), and/or one or more graphics processing units (GPUs), and/or one or more application specific integrated circuits (ASICs), and/or one or more neural processing units (NPUs), and/or one or more tensor processing units (TPUs), etc. More generally, any processor corresponds to a general-purpose processing unit or an application-specific processor unit.

The computing system 1402 also includes computer-readable storage media 1406, corresponding to one or more computer-readable media hardware units. The computer-readable storage media 1406 retains any kind of information 1408, such as machine-readable instructions, settings, model weights, and/or other data. In some implementations, the computer-readable storage media 1406 includes one or more solid-state devices, one or more hard disks, one or more optical disks, etc. Any instance of the computer-readable storage media 1406 uses any technology for storing and retrieving information. Further, any instance of the computer-readable storage media 1406 represents a fixed or removable unit of the computing system 1402. Further, any instance of the computer-readable storage media 1406 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media; a computer-readable storage medium or storage device is "non-transitory" in this regard.

The computing system 1402 utilizes any instance of the computer-readable storage media 1406 in different ways. For example, in some implementations, any instance of the computer-readable storage media 1406 represents a hardware memory unit (such as random access memory (RAM)) for storing information during execution of a program by the computing system 1402, and/or a hardware storage unit (such as a hard disk) for retaining/archiving information on a more permanent basis. In the latter case, the computing system 1402 also includes one or more drive mechanisms 1410 (such as a hard drive mechanism) for storing and retrieving information from an instance of the computer-readable storage media 1406.

In some implementations, the computing system 1402 performs any of the functions described above when the processing system 1404 executes computer-readable instructions stored in any instance of the computer-readable storage media 1406. For instance, in some implementations, the computing system 1402 carries out computer-readable instructions to perform each block of the processes described with reference to FIGS. 10-12. FIG. 14 generally indicates that hardware logic circuitry 1412 includes any combination of the processing system 1404 and the computer-readable storage media 1406.

In addition, or alternatively, the processing system 1404 includes one or more other configurable logic units that perform operations using a collection of logic gates. For instance, in some implementations, the processing system 1404 includes a fixed configuration of hardware logic gates, e.g., that are created and set at the time of manufacture, and thereafter unalterable. In addition, or alternatively, the processing system 1404 includes a collection of programmable hardware logic gates that are set to perform different application-specific tasks. The latter category of devices includes programmable array logic devices (PALs), generic array logic devices (GALs), complex programmable logic devices (CPLDs), field-programmable gate arrays (FPGAs), etc. In these implementations, the processing system 1404 effectively incorporates a storage device that stores computer-readable instructions, insofar as the configurable logic units are configured to execute the instructions and therefore embody or store these instructions.

In some cases (e.g., in the case in which the computing system 1402 represents a user computing device), the computing system 1402 also includes an input/output interface 1414 for receiving various inputs (via input devices 1416), and for providing various outputs (via output devices 1418). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1420 and an associated graphical user interface presentation (GUI) 1422. The display device 1420 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1402 also includes one or more network interfaces 1424 for exchanging data with other devices via one or more communication conduits 1426. One or more communication buses 1428 communicatively couple the above-described units together.

The communication conduit(s) 1426 is implemented in any manner, e.g., by a local area computer network, a wide area computer network (e.g., the Internet), point-to-point connections, or any combination thereof. The communication conduit(s) 1426 include any combination of hardwired links, wireless links, routers, gateway functionality, name servers, etc., governed by any protocol or combination of protocols.

FIG. 14 shows the computing system 1402 as being composed of a discrete collection of separate units. In some cases, the collection of units corresponds to discrete hardware units provided in a computing device chassis having any form factor. FIG. 14 shows illustrative form factors in its bottom portion. In other cases, the computing system 1402 includes a hardware logic unit that integrates the functions of two or more of the units shown in FIG. 14. For instance, in some implementations, the computing system 1402 includes a system on a chip (SoC or SOC), corresponding to an integrated circuit that combines the functions of two or more of the units shown in FIG. 14.

The following summary provides a set of illustrative examples of the technology set forth herein.

(A1) According to one aspect, a method (e.g., the process 1002) is described for controlling labeling of items using a computer-implemented agent. The method includes receiving (e.g., in block 1004) a first input that specifies a language model (e.g., the language model 104) to use in labeling items in a set of items. The method further includes receiving (e.g., in block 1006)

a second input that specifies a task description to be given to the language model, the task description describing a group of classes to be used to label the items in the set of items, the task description also providing an instruction to the language model to specify another class upon determining that none of the group of classes applies to the particular item. The method further includes receiving (e.g., in block 1008) an instruction to commence a labeling run based on the items in the set of items.

In response to receiving the instruction to commence, for a particular item of the set of items, the method incudes performing (e.g., in block 1010) a language model interaction that includes sending the task description and the particular item to the language model, and receiving a response generated by the language model based on the task description and the particular item. The response specifies a particular class associated with the particular item. As expressed by loop 1012, the language model interaction is repeated for other items in the set of items. The method further includes receiving (e.g., in block 1014) an instruction to pause the labeling run prior to the language model labeling all of the items in the set of items, and receiving (e.g., in block 1016) an instruction to review responses produced by the language model for one or more of the items in the set of items.

(A2) According to some implementations of the method of A1, the method further includes: after receiving the instruction to pause the labeling run, receiving an input that specifies a modification to the prompt; receiving an instruction to recommence the labeling run after the modification to the prompt has been made; and in response to the instruction to recommence, restarting the labeling run from a point at which the labeling run was paused.

(A3) According to some implementations of the method of A1 or A2, the method further includes generating an integrated user interface presentation having sections with graphical controls for defining the labeling run including the task description, starting the labeling run, stopping the labeling run, reviewing classification results and accuracy of the language model, changing the task description, and restarting the labeling run. The method further includes receiving instructions in response to interaction with the graphical controls.

(A4) According to some implementations of any of the methods of A1-A3, the method further includes, after receiving plural responses generated by the language model associated with plural items of the set of items: determining that an additional class, not among the group of classes, satisfies a prescribed test; and automatically updating the group of classes in the task description to include the additional class.

(A5) According to some implementations of the method of A4, the prescribed test includes determining whether the language model has specified the additional class in the plural responses a prescribed number of times and/or whether a prescribed percentage of the plural responses include the additional class.

(A6) According to some implementations of the method of A4, the language model is a particular language model. The method further includes collecting responses from other language models, in additional to the particular language model. The prescribed test includes determining a total number of times that the particular language model and the other language models have detected the additional class, determining a diversity measure that expresses a number of times that each of the particular language model and the other language models have specified the additional class, and determining whether the additional class should be added based on a combination of the total number and the diversity measure.

(A7) According to some implementations of any of the methods of A1-A6, the method further includes: determining that a prescribed transition point has been reached in a process of labeling the set of items; and in response to the determining that the prescribed transition point has been reached, automatically training a machine-trained model based on a set of training examples, each training example including a given item, and a particular class associated with the given item specified by the language model.

(A8) According to some implementations of any of the methods of A1-A7, the language model is a first language model, and the method further includes: determining that a prescribed transition point has been reached in a process of labeling the set of items; and in response to the determining that the prescribed transition point has been reached, commence interaction with a second language model instead of the first language model. The second language model has different capabilities compared to the first language model.

(A9) According to some implementations of any of the methods of A1-A8, the language model is a first language model, and the method further includes: determining that the response by the first language model contains control information that signals use of a second language model because the first language model is unable to assign a classification to the particular item; submitting the particular item to the second language model in response to the control information; and receiving a response from the second language model that provides a classification of the particular item.

(A10) According to some implementations of any of the methods of A1-A9, the first input specifies plural language models, and the second input specifies plural task descriptions to be provided to the plural language models, at least two task descriptions of the plural task descriptions differing from each other. The sending the task description includes, for the particular item of the set of items, sending the plural task descriptions to the respective plural language models, together with the particular item. The receiving a response includes receiving responses generated by the plural language models based on the plural task descriptions and the particular item, the responses including particular classes specified by the plural language models.

(A11) According to some implementations of the method of A10, at least two language models of the plural language models are different kinds of models.

(A12) According to some implementations of the method of A10, at least two task descriptions specify different groups of classes.

(A13) According to some implementations of the method of A10, at least two task descriptions specify different sets of examples.

(A14) According to some implementations of the method of A10, the method further includes determining, for the particular item of the set of items, a final class for the particular item by generating a tally or weighted tally of a number of times the plural language models have selected each class of the particular classes generated by the plural language models, and selecting one of the particular classes that has a highest tally or weighted tally.

(A15) According to some implementations of the method of A10, the method further includes receiving accuracy information that describes an accuracy of each language model of the plural language model; and automatically increasing a weight associated with a particular language model of the plural language model in response to an increase in the accuracy, and decreasing the weight associated with the particular language model of the plural language models in response to a decrease in the accuracy.

(A16) According to some implementations of any of the methods of A1-A15, the language model interaction occurs independent of existence of prior manually labeled items.

In yet another aspect, some implementations of the technology described herein include a computing system (e.g., the computing system 1402) that includes a processing system (e.g., the processing system 1404) having a processor. The computing system also includes a storage device (e.g., the computer-readable storage media 1406) for storing computer-readable instructions (e.g., the information 1408). The processing system executes the computer-readable instructions to perform any of the methods described herein (e.g., any individual method of the methods of A1-A16).

In yet another aspect, some implementations of the technology described herein include a computer-readable storage medium (e.g., the computer-readable storage media 1406) for storing computer-readable instructions (e.g., the information 1408). A processing system (e.g., the processing system 1404) executes the computer-readable instructions to perform any of the operations described herein (e.g., the operations in any individual method of the methods of A1-A16).

More generally stated, any of the individual elements and steps described herein are combinable into any logically consistent permutation or subset. Further, any such combination is capable of being manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms are configurable to perform an operation using the hardware logic circuitry 1412 of FIG. 14. The term "logic" likewise encompasses various physical and tangible mechanisms for performing a task. For instance, each processing-related operation illustrated in the flowcharts of FIGS. 10-12 corresponds to a logic component for performing that operation.

This description may have identified one or more features as optional. This type of statement is not to be interpreted as an exhaustive indication of features that are to be considered optional; generally, any feature is to be considered as an example, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

In terms of specific terminology, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. The phrase "any combination thereof" refers to any combination of two or more elements in a list of elements. Further, the terms "comprising," "including," and "having" are open-ended terms that are used to identify at least one part of a larger whole, but not necessarily all parts of the whole. A "set" is a group that includes one or more members. The phrase "A corresponds to B" means "A is B" in some contexts. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for labeling of items for use in training a machine-trained model, comprising:

receiving, by a labeling control computer program, a first input that specifies a machine-trained language model to use in labeling items in a set of items;

receiving, by the labeling control computer program, a second input that specifies a text-based task description to be given to the language model, the task description describing a group of classes to be used to label the items in the set of items, the task description also providing an instruction to the language model to specify another class, not specified in the task description, upon determining that none of the classes specified in the task description applies to the particular item;

in response to receiving an instruction to commence a labeling run, for a particular item of the set of items, performing, by the labeling control computer program, a language model interaction that includes sending a prompt that includes the task description and the particular item to the language model, and receiving a response generated by the language model based on the task description and the particular item, the response specifying a particular class associated with the particular item;

repeating, by the labeling control computer program, the language model interaction for other items in the set of items;

producing, by the labeling control computer program, a training set that includes training examples, each training example including a given item and a ground-truth output result, the ground-truth output result being a class associated with the given item specified by the language model for the given item;

determining, by the labeling control computer program, that a prescribed transition point has been reached in a process of labeling the set of items; and in response to the determining that the prescribed transition point has been reached, automatically training, by a training system, the machine-trained model based on the set of training examples, the automatically training involving iteratively updating weights of the machine-trained model.

2. The method of claim 1, further comprising:

after receiving an instruction to pause the labeling run, receiving an input that specifies a modification to the prompt;

receiving an instruction to recommence the labeling run after the modification to the prompt has been made; and in response to the instruction to recommence, restarting the labeling run from a point at which the labeling run was paused.

3. The method of claim 1, further comprising:

generating, by the labeling control computer program, an integrated user interface presentation having sections with graphical controls for defining the labeling run including the task description, starting the labeling run, stopping the labeling run, reviewing classification results and accuracy of the language model, changing the task description, and restarting the labeling run; and receiving instructions in response to interaction with the graphical controls.

4. The method of claim 1, further comprising, after receiving plural responses generated by the language model associated with plural items of the set of items:

determining that an additional class, not among the classes specified in the task description, satisfies a prescribed test; and automatically updating the group of classes in the task description to include the additional class.

5. The method of claim 4, wherein the prescribed test includes determining whether the language model has specified the additional class in the plural responses a prescribed number of times and/or whether a prescribed percentage of the plural responses include the additional class.

6. The method of claim 4, wherein the language model is a particular language model, wherein the method further comprises collecting responses from other language models, in additional to the particular language model, and wherein the prescribed test includes determining a total number of times that the particular language model and the other language models have detected the additional class, determining a diversity measure that expresses a number of times that each of the particular language model and the other language models have specified the additional class, and determining whether the additional class should be added based on a combination of the total number and the diversity measure.

7. The method of claim 1, wherein the language model is a first language model, and wherein the method further comprises:

determining that another prescribed transition point has been reached in a process of labeling the set of items; and in response to the determining that said another prescribed transition point has been reached, commence interaction with a second language model instead of the first language model, the second language model having different capabilities compared to the first language model.

8. The method of claim 1, wherein the language model is a first language model, and wherein the method further comprises, for another item:

determining that a response by the first language model contains control information that signals use of a second language model because the first language model is unable to assign a classification to said another item;

submitting said another item to the second language model in response to the control information; and receiving a response from the second language model that provides a classification of said another item.

9. The method of claim 1, wherein the first input specifies plural language models, wherein the second input specifies plural task descriptions to be provided to the plural language models, at least two task descriptions of the plural task descriptions differing from each other, wherein the sending the prompt includes, for the particular item of the set of items, sending the plural task descriptions to the respective plural language models, together with the particular item, and wherein the receiving a response includes receiving responses generated by the plural language models based on the plural task descriptions and the particular item, the responses including particular classes specified by the plural language models.

10. The method of claim 9, wherein at least two language models of the plural language models are different kinds of models.

11. The method of claim 9, wherein said at least two task descriptions specify different groups of classes.

12. The method of claim 9, wherein said at least two task descriptions specify different sets of examples.

13. The method of claim 9, further comprising determining, for the particular item of the set of items, a final class for the particular item by generating a tally of a number of times the plural language models have selected each class of the particular classes generated by the plural language models, and selecting one of the particular classes that has a highest tally.

14. The method of claim 9, further comprising:

receiving accuracy information that describes an accuracy of each language model of the plural language models; and automatically increasing a weight associated with a particular language model of the plural language models in response to an increase in the accuracy of the particular language model, and decreasing the weight associated with the particular language model of the plural language models in response to a decrease in the accuracy of the particular language model.

15. The method of claim 1, wherein the language model interaction occurs independent of existence of prior manually labeled items.

16. A computing system for labeling items for use in training a machine-trained model, comprising:

a memory;

a processing system for executing computer-readable instructions, to perform operations including:

in a language model interaction performed by a labeling computer control program, sending a prompt that includes a text-based task description and a particular item in a set of items to a machine-trained language model, the task description describing a group of classes to be used in labeling the particular item, the task description also providing an instruction to the language model to specify another class, not specified in the task description, upon determining that none of the classes specified in the task description applies to the particular item;

as part of the language model interaction, receiving a response generated by the language model based on the task description and the particular item, the response specifying a particular class associated with the particular item;

repeating, by the labeling computer control program, the language model interaction for other items in the set of items, to provide plural responses;

determining, based on the responses, that an additional class, not among the classes specified in the task description, satisfies a prescribed test;

automatically updating the group of classes in the task description in the prompt to include the additional class;

producing, by the labeling control computer program, a training set that includes training examples, each training example including a given item and a ground-truth output result, the ground-truth output result being a class associated with the given item specified by the language model for the given item; and automatically training the machine-trained model based on the set of training examples, the automatically training involving iteratively updating weights of the machine-trained model.

17. The computing system of claim 16, wherein the language model is a particular language model, wherein the method further comprises collecting responses from other language models, in addition to the particular language model, and wherein the prescribed test includes determining a total number of times that the particular language model and the other language models have detected the additional class, determining a diversity measure that expresses a number of times that each of the particular language model and the other language models have specified the additional class, and determining whether the additional class should be added based on a combination of the total number and the diversity measure.

18. A computer-readable storage medium for storing computer-readable instructions, a processing system executing the computer-readable instructions to perform operations, the operations comprising each of:

sending plural text-based task descriptions to plural machine-trained language models in plural respective prompts, together with a particular item of a set of items, wherein a particular task description of the plural task descriptions describes a particular group of classes to be used to label the particular item, and wherein the particular task description also provides an instruction to the language model to specify another class, not specified in the particular task description, upon determining that none of the group of classes applies to the particular item, and wherein at least two task descriptions of the plural task descriptions differ from each other;

receiving responses generated by the plural language models based on the plural task descriptions and the particular item, the responses including particular classes specified by the plural language models associated with the particular item;

determining a final class for the particular item based on the particular classes generated by the plural language models;

repeating the sending, receiving, and determining for other items in the set of items, to generate plural final classes for the items;

producing a training set that includes training examples, each training example including a given item and a ground-truth output result, the ground-truth output result being a particular final class associated with the given item; and automatically training the machine-trained model based on the set of training examples, the automatically training involving iteratively updating weights of the machine-trained model.

19. The computer-readable storage medium of claim 18, wherein said at least two task descriptions specify different groups of classes.

* * * * *